Figure 1:
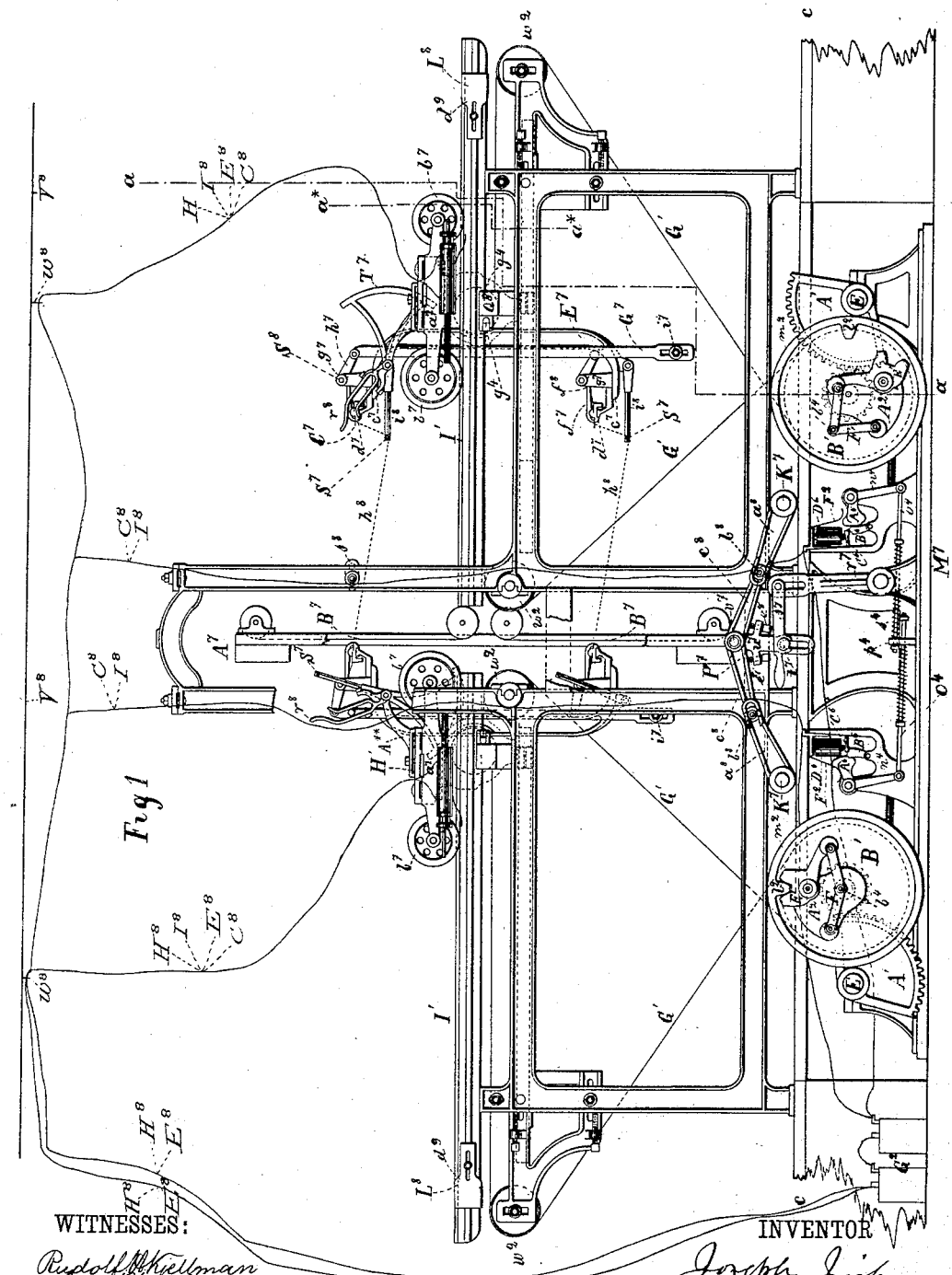

(No Model.)  14 Sheets—Sheet 1.

J. IRISH.
EMBROIDERING MACHINE.

No. 348,562.  Patented Sept. 7, 1886.

WITNESSES:  INVENTOR
 Rudolf H. Kjellman  Joseph Irish
 John H. Fisher  BY James A. Whitney
  ATTORNEY (No Model.) 14 Sheets—Sheet 3.

J. IRISH.
EMBROIDERING MACHINE.

No. 348,562. Patented Sept. 7, 1886.

WITNESSES:
Rudolph Kjellman
John H. Fisher

INVENTOR
Joseph Irish
BY
James A. Whitney
ATTORNEY (No Model.)  14 Sheets—Sheet 4.
J. IRISH.
EMBROIDERING MACHINE.

No. 348,562. Patented Sept. 7, 1886.

WITNESSES
Rudolf A. Kjellman
John H. Fisher

INVENTOR
Joseph Irish
BY James A. Whitney
ATTORNEY

N. PETERS, Photo-Lithographer, Washington, D. C.

(No Model.) 14 Sheets—Sheet 5.

J. IRISH.
EMBROIDERING MACHINE.

No. 348,562. Patented Sept. 7, 1886.

WITNESSES:
Gunvald Aas.
Joseph M. Rice

INVENTOR
Joseph Irish.
BY James A. Whitney
ATTORNEY (No Model.) 14 Sheets—Sheet 6.
J. IRISH.
EMBROIDERING MACHINE.
No. 348,562. Patented Sept. 7, 1886.
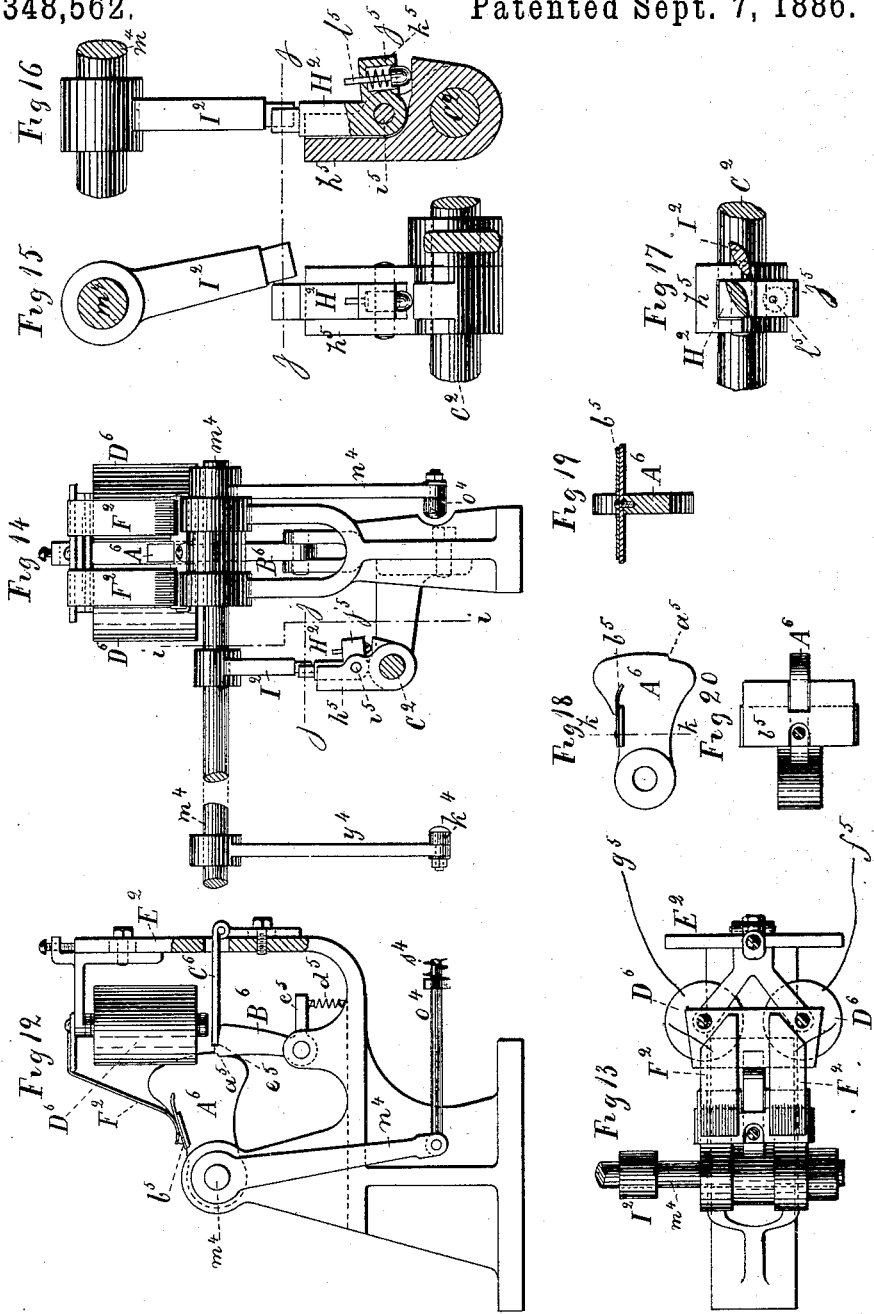
WITNESSES:
Rudolf H. Kjellman
John H. Fisher
INVENTOR
Joseph Irish
BY
James A. Whitney
ATTORNEY (No Model.) 14 Sheets—Sheet 7.
J. IRISH.
EMBROIDERING MACHINE.
No. 348,562. Patented Sept. 7, 1886.
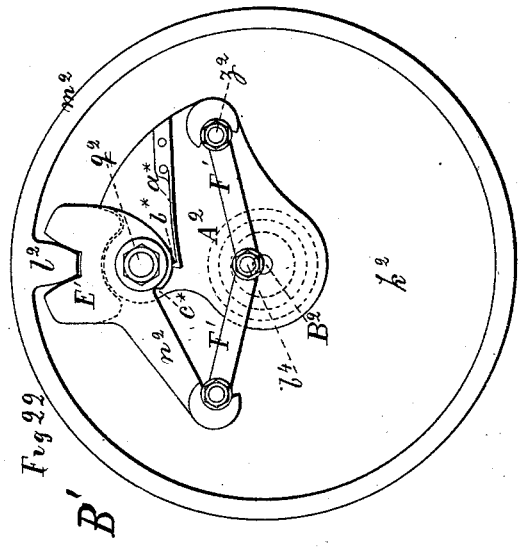
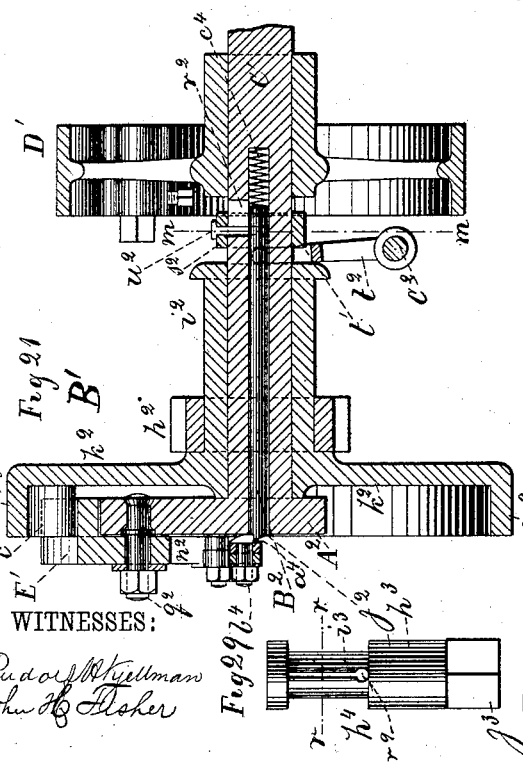
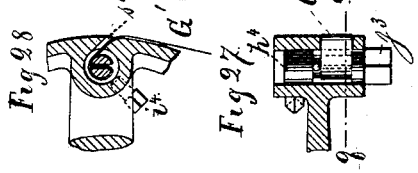
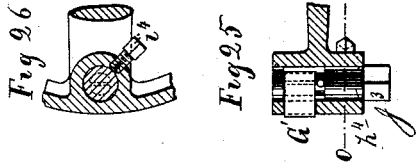
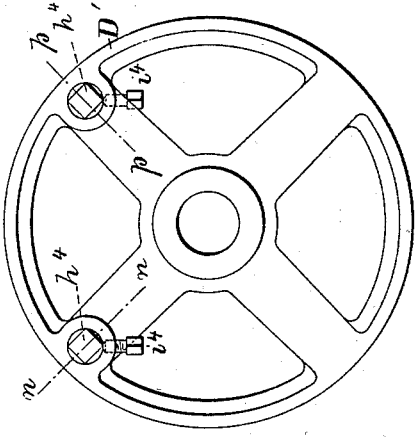
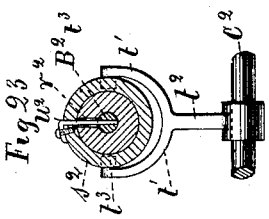
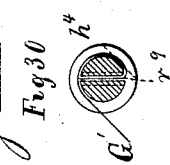
WITNESSES:
Rudolf Kjellman
John H. Fisher
INVENTOR
Joseph Irish
BY
James A. Whitney
ATTORNEY

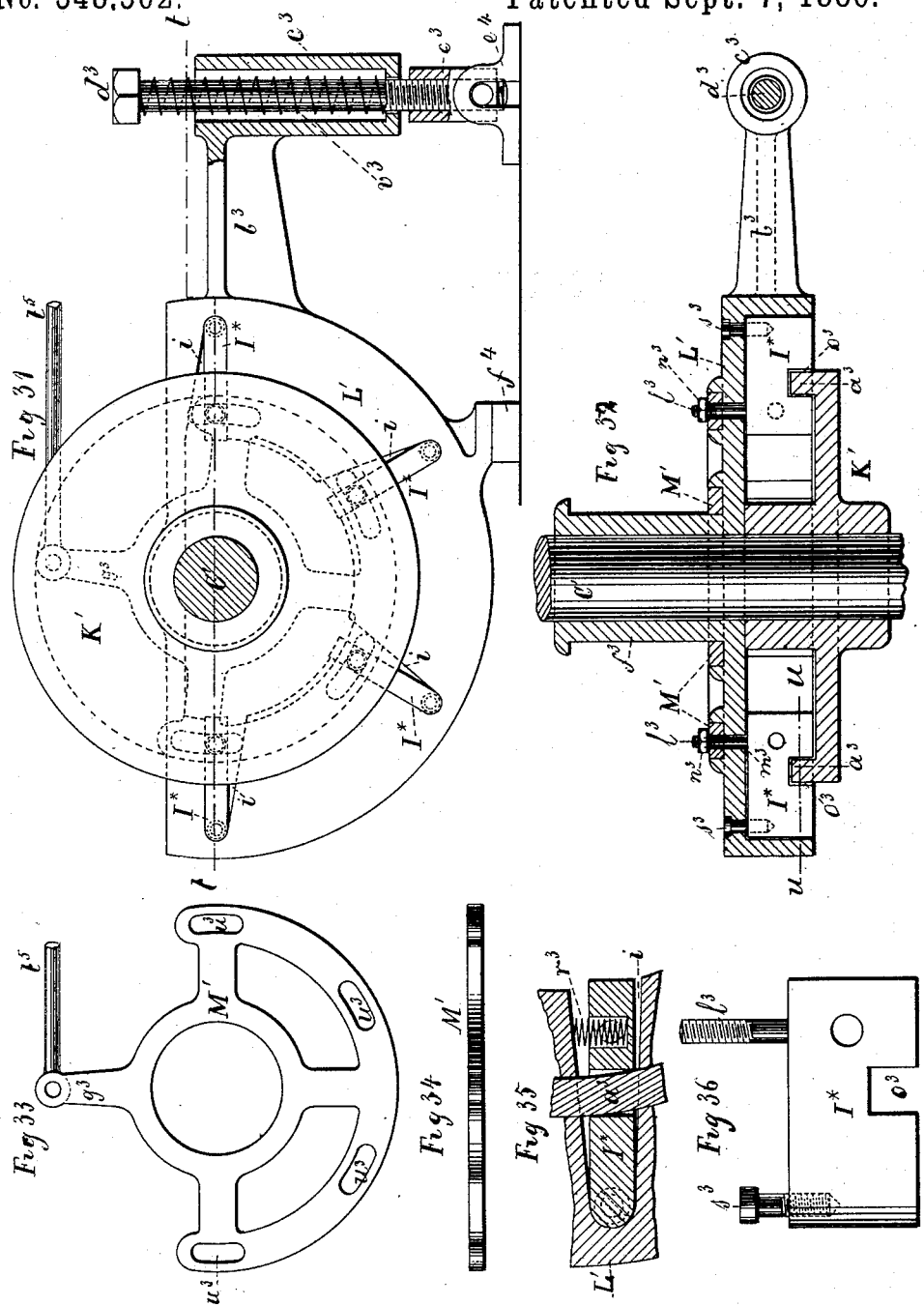

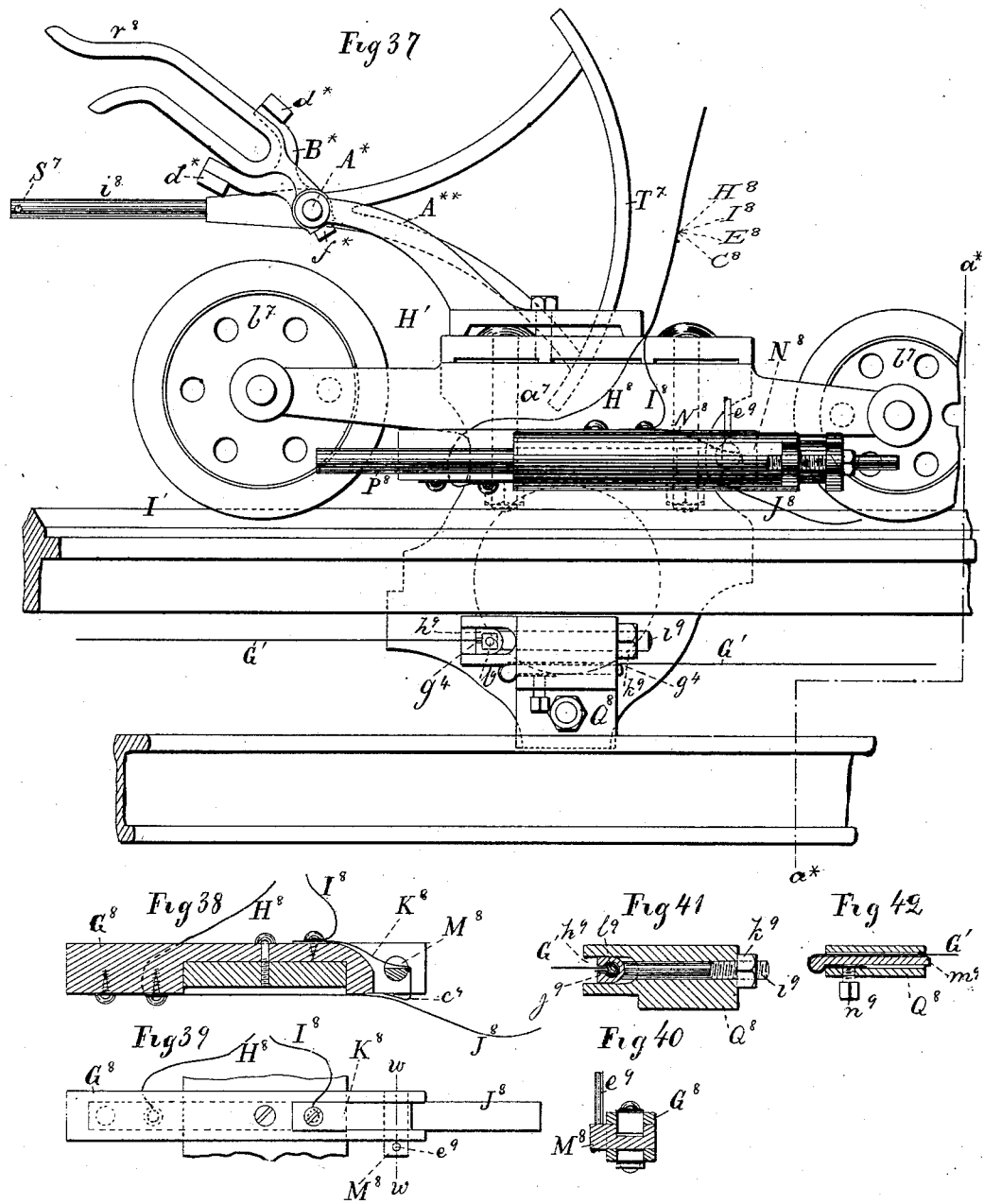

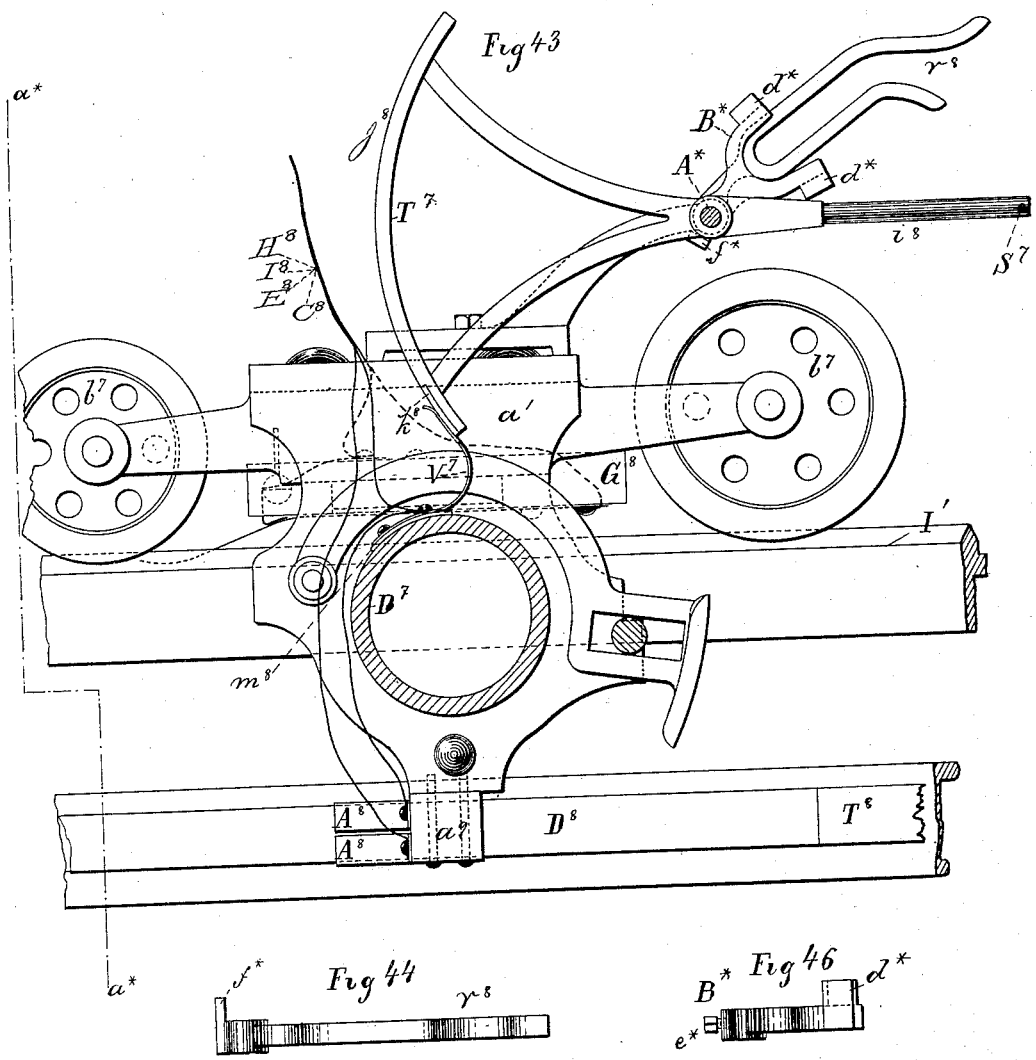
(No Model.)
14 Sheets—Sheet 10.
J. IRISH.
EMBROIDERING MACHINE.
No. 348,562.
Patented Sept. 7, 1886.
WITNESSES:
INVENTOR
Joseph Irish
BY
James A. Whitney
ATTORNEY (No Model.) 14 Sheets—Sheet 11.
J. IRISH.
EMBROIDERING MACHINE.
No. 348,562. Patented Sept. 7, 1886.
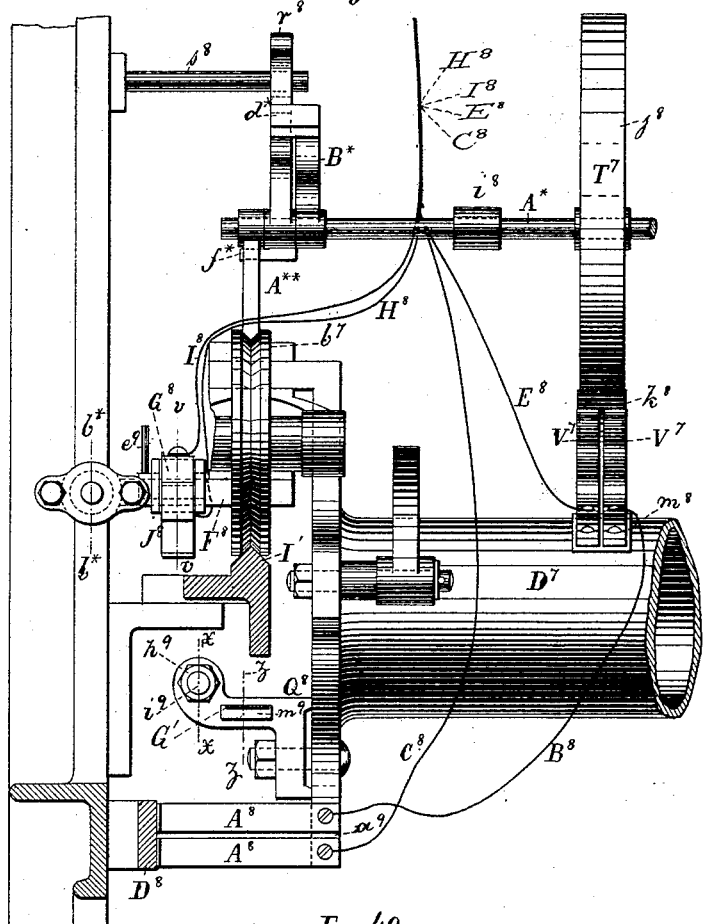
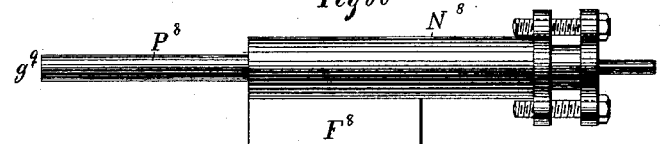
WITNESSES:
Rudolph Hutlman
John B. Fisher
INVENTOR
Joseph Irish
BY
James A. Whitney
ATTORNEY

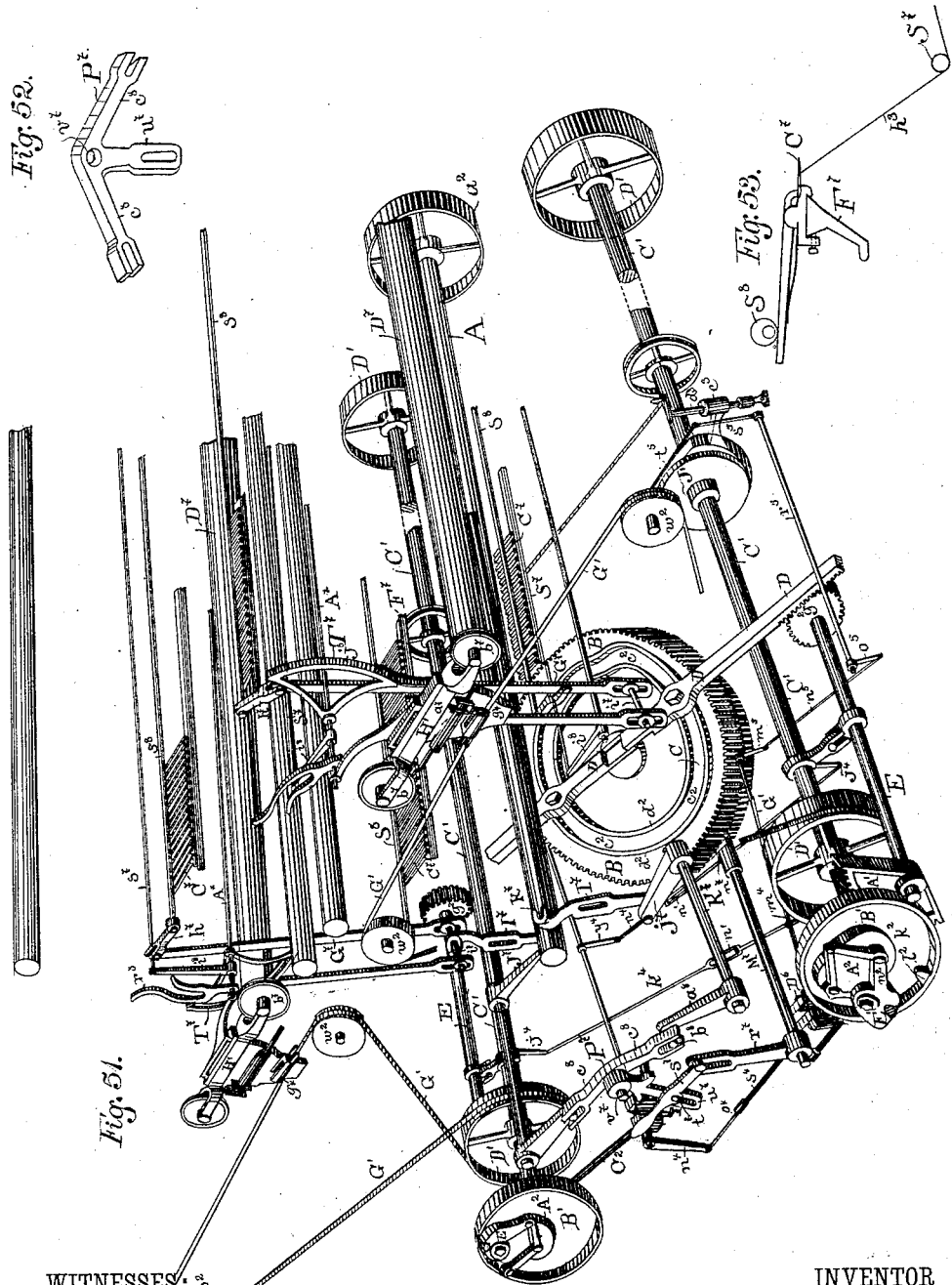

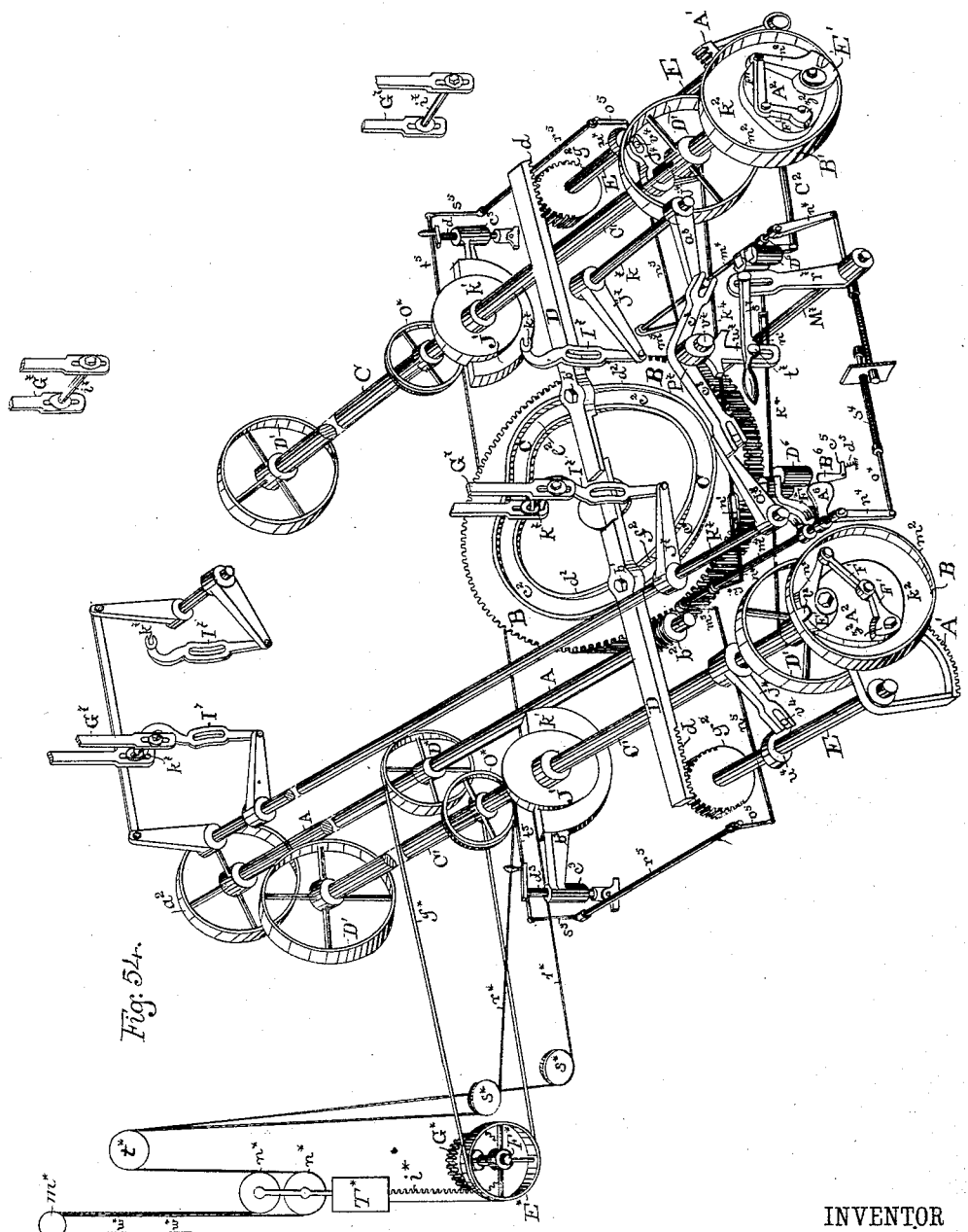

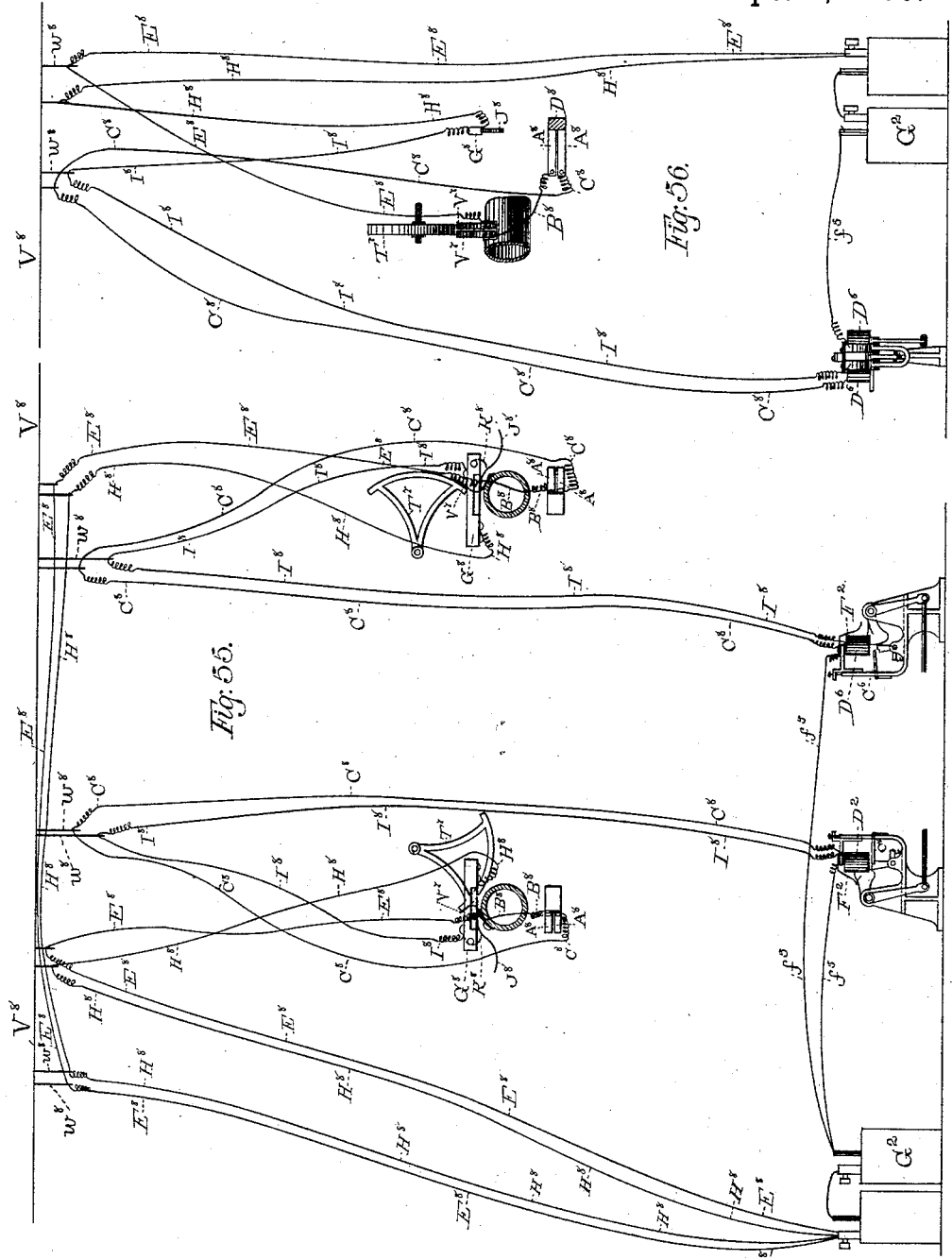

UNITED STATES PATENT OFFICE.

JOSEPH IRISH, OF NEW YORK, N. Y., ASSIGNOR TO JAMES McVICKAR, OF SAME PLACE.

EMBROIDERING-MACHINE.

SPECIFICATION forming part of Letters Patent No. 348,562, dated September 7, 1886.

Application filed February 7, 1884. Renewed November 23, 1885. Serial No. 183,723. (No model.)

*To all whom it may concern:*

Be it known that I, JOSEPH IRISH, of the city, county, and State of New York, have invented Improvements in Embroidering-Machines, of which the following is a specification.

This invention relates to that class of embroidering-machines in which needle-carriages are arranged in such relation with a tambour-frame that the needles are passed through from one side to the other of the fabric carried by the tambour-frame alternately in opposite directions, the tambour-frame and carriage being adjustable with reference to each other in such manner that each successive series of stitches may take appropriate place in the design to be embroidered upon the fabric aforesaid.

The object of my invention is to insure the operation of embroidering-machines of the class aforesaid without the necessity of that close attention and actual personal control in certain of its operations which heretofore have been required of the attendant or operator with machinery of the class aforesaid.

My invention comprises certain novel means and combinations of parts, hereinafter set forth and described, whereby the aforesaid and other advantages are effectually secured.

Figure 2:
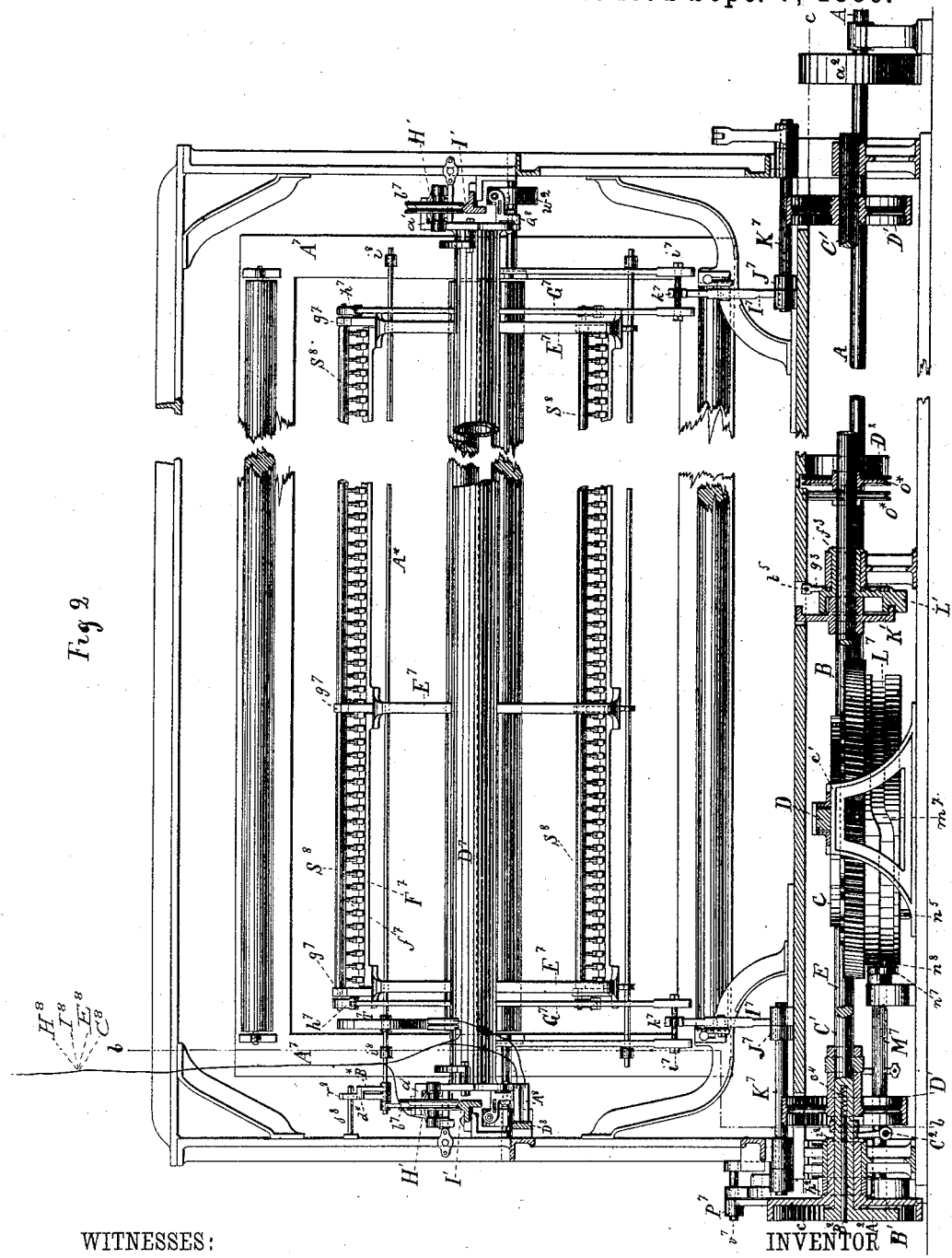
Figure 3:
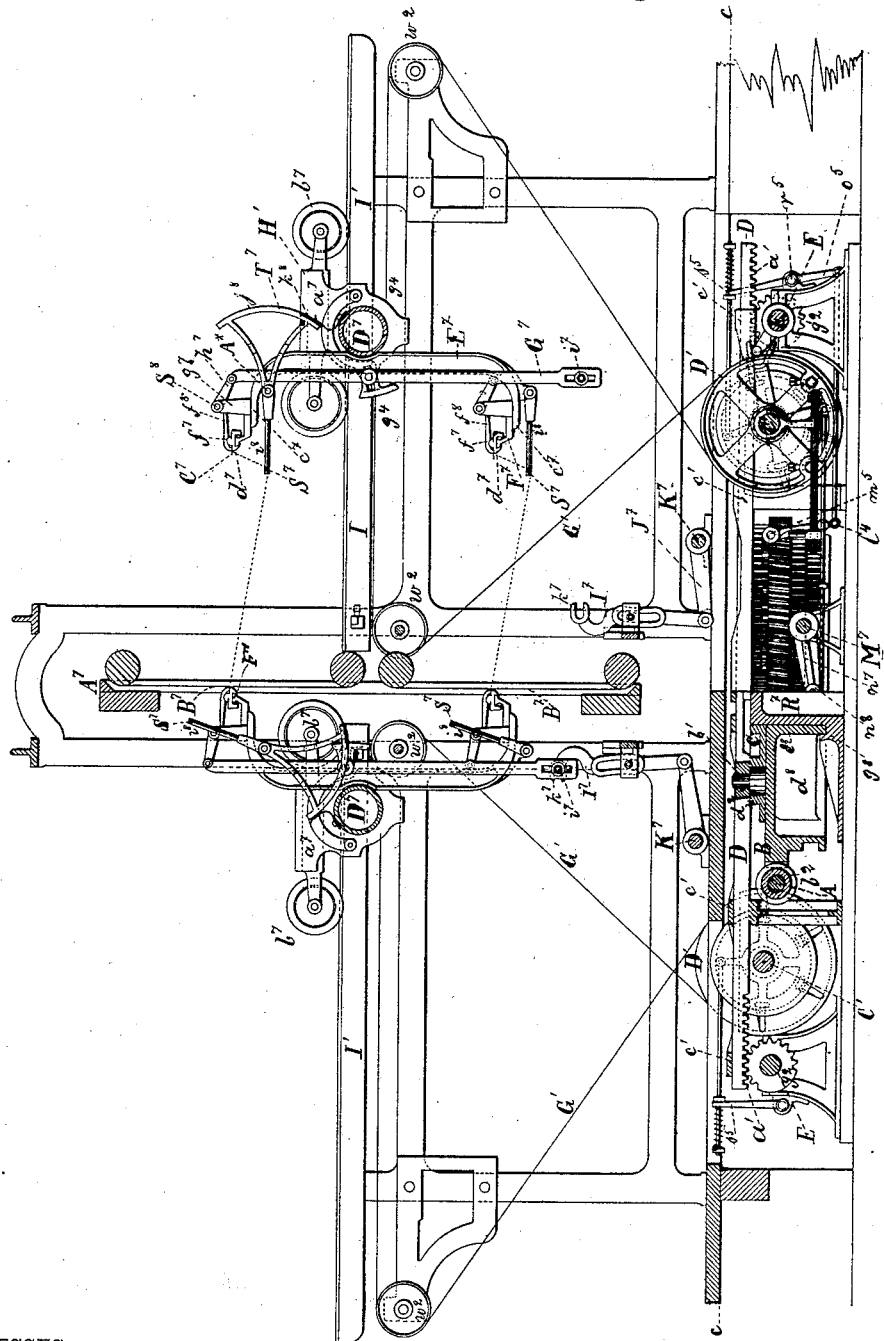
Figure 4:
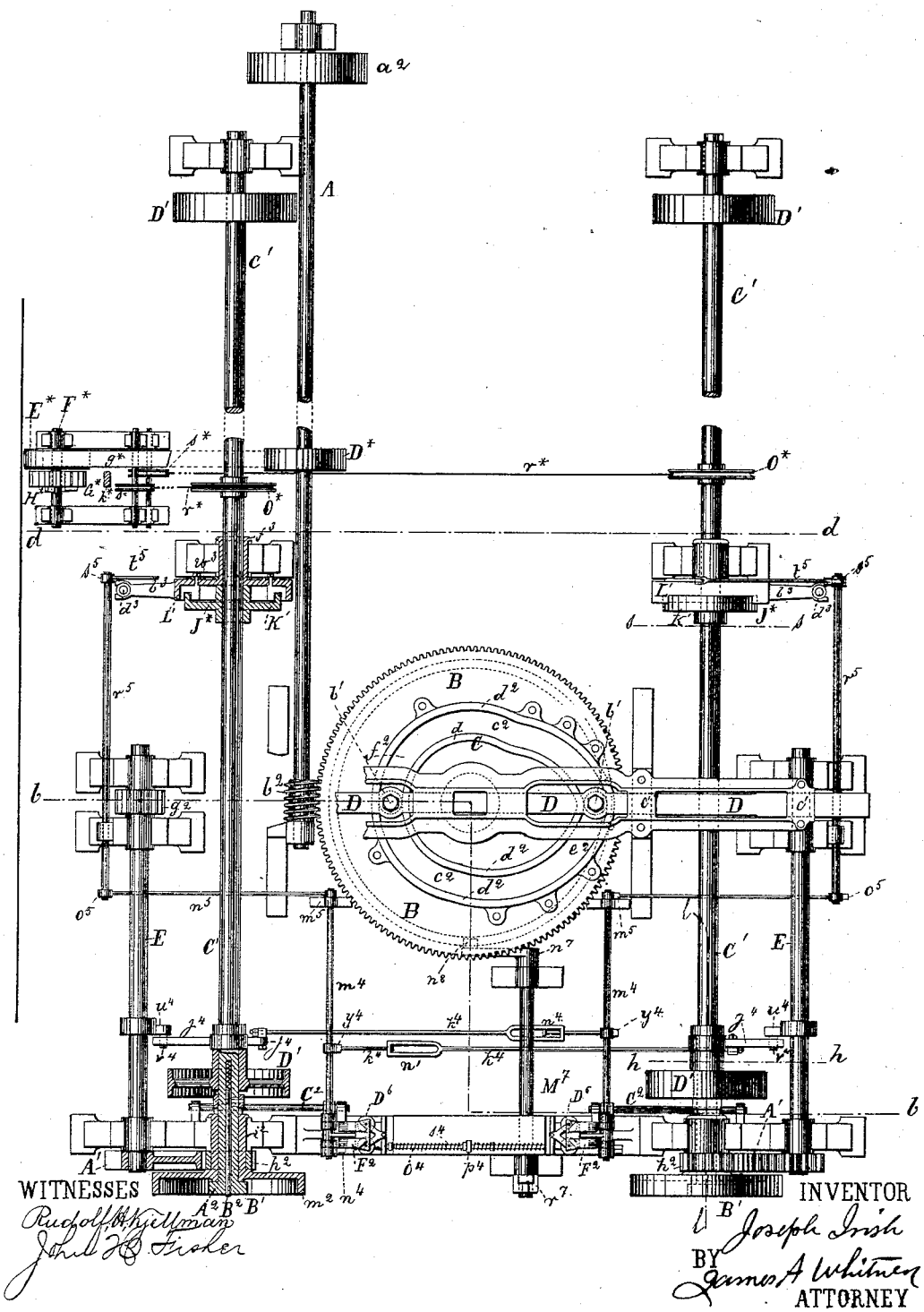
Figure 7:
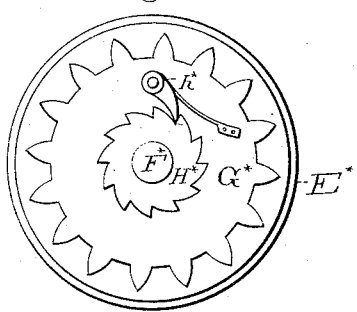
Figure 8:
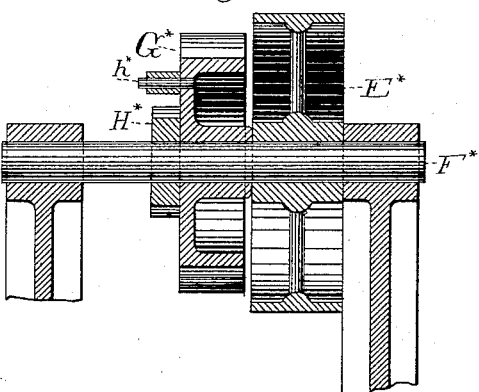
Figure 9:
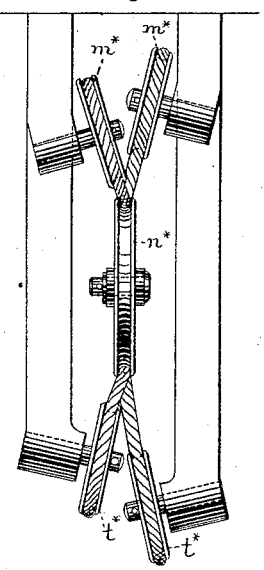
Figures 6, 10:
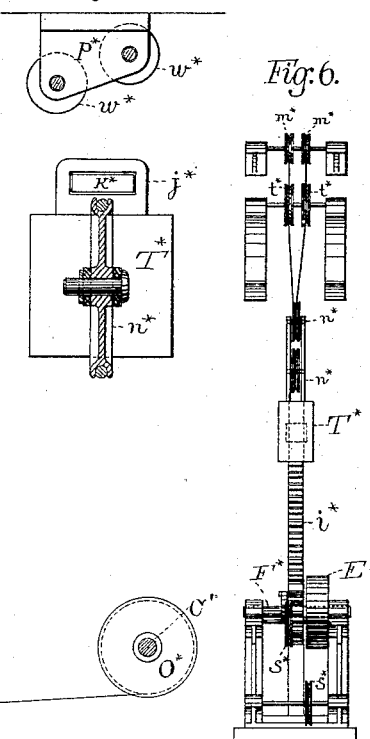
Figure 5:
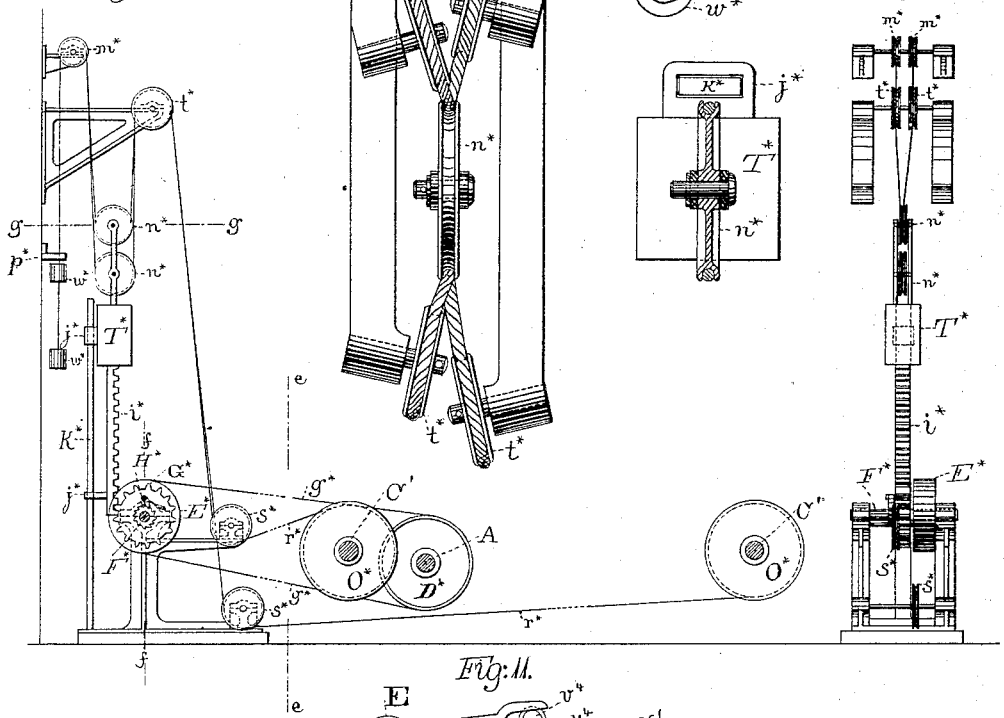
Figure 11:
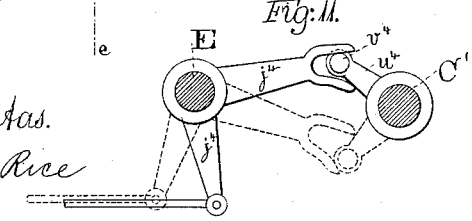

Figure 1 is an end view of an apparatus embracing the several features of my said invention. Fig. 2 is a vertical longitudinal sectional view taken in the line $a\ a$ of Fig. 1. Fig. 3 is a vertical transverse sectional view taken in line $b\ b$ of Figs. 2 and 4. Fig. 4 is a horizontal sectional view taken in the line $c\ c$ in Figs. 1, 2, and 3. Fig. 5 is a vertical transverse sectional view of certain parts of said apparatus, taken in line $d\ d$ of Fig. 4. Fig. 6 is a side view and partial section of the parts shown in Fig. 5, taken in the line $e\ e$ of said Fig. 5. The remaining figures are on a larger scale, in order to better illustrate the parts shown therein. Fig. 7 is a detached detail view of certain parts of the apparatus, and shown, for example, in Fig. 5. Fig. 8 is a detail sectional view taken in the line $f\ f$ of Fig. 5 and in a plane at right angles to that of said Fig. 5 and of Fig. 7, and representing certain parts of said apparatus. Fig. 9 is a plan view of the devices indicated in Fig. 5. Fig. 10 is a detail horizontal sectional view taken in the line $g\ g$ of Fig. 5. Fig. 11 is a vertical transverse sectional view of certain parts of said apparatus, and taken in the line $h\ h$ of Fig. 4. Fig. 12 is a detail side view of certain parts illustrated on a smaller scale in Fig. 1. Fig. 13 is a plan view of the parts represented in Fig. 12. Fig. 14 is a detail side view, taken in a plane at right angles to Fig. 12, of the parts shown in Figs. 12 and 13. Fig. 15 is a detail sectional view, on a still larger scale, taken in the line $i\ i$ of Fig. 14. Fig. 16 is a detail sectional view of the parts shown in Fig. 15, and taken in a plane at right angles to said Fig. 15. Fig. 17 is a horizontal sectional view of the parts shown in Figs. 15 and 16, and taken in the line $j\ j$ of said figures. Fig. 18 is a detail view, on the same scale as Fig. 7, of certain parts, also illustrated in said Fig. 13. Fig. 19 is a sectional view of said parts taken in the line $k\ k$ of Fig. 18. Fig. 20 is a plan view of the parts shown in Figs. 18 and 19. Fig. 21 is a detail partial vertical sectional view, on a scale larger than that of Figs. 1 to 6, but smaller than that of Fig. 7, of certain parts of the apparatus, and taken in the line $l\ l$ of Fig. 4. Fig. 22 is a face view, as seen from the left-hand end of Fig. 21, of certain of the parts shown in said Fig. 21. Fig. 23 is a detail sectional view of certain other parts shown in said Fig. 21, taken in the line $m\ m$ of said figure, and as seen from the right-hand end of said figure. Fig. 24 is a detached detail face view of certain parts shown in Fig. 21, and as seen from the left-hand end of said Fig. 21. Fig. 25 is a detail sectional view of certain parts of the devices represented in Fig. 24, and taken in the line $n\ n$ of said figure. Fig. 26 is a detail sectional view taken in line $o\ o$ of Fig. 25. Fig. 27 is a detail sectional view taken in the line $p\ p$ of Fig. 24. Fig. 28 is a detail sectional view taken in the line $q\ q$ of Fig. 27. Fig. 29 is a detail plan view, on a larger scale, of one of the parts shown in Figs. 24, 25, and 26. Fig. 30 is a transverse sectional view taken in the line $r\ r$ of Fig. 29. Fig. 31 is a detached detail and partial sectional view, on the same scale as Fig. 7, of certain parts represented in Fig. 4, and taken in the line $s\ s$ of said figure. Fig. 32 is a horizontal sectional view taken in the line $t\ t$ of Fig. 31. Fig. 33 is a detached face view of one of the parts represented in Figs. 31 and 32. Fig. 34 is a plan view of the part shown in Fig. 33. Fig. 35 is a detail sectional view, on a larger scale, of certain parts shown in Figs. 31 and 32, and taken in line $u\ u$ of Fig. 32. Fig. 36 is a plan view of one of the parts shown in Fig. 35. Fig. 37 is a vertical elevation, as seen from the same standpoint as Fig. 1, on the same scale as Fig. 7, of certain parts shown on a smaller scale in said Fig. 1. Fig. 38 is a sectional view of certain parts of the apparatus, and taken in the line $v\ v$ of Fig. 48. Fig. 39 is a plan view of the parts shown in Fig. 38. Fig. 40 is a sectional view taken in the line $w\ w$ of Fig. 39. Fig. 41 is a detail sectional view taken in the line $x\ x$ of Fig. 48. Fig. 42 is a detail sectional view taken in the line $z\ z$ of Fig. 48. Fig. 43 is a rear elevation of the parts shown in Fig. 37—that is to say, as seen from the opposite or rearmost point of view. Fig. 44 is a top view of one of the parts shown, on the same scale in Figs. 37 and 43. Fig. 45 is a side view of said part. Fig. 46 is a top view of another part shown in Figs. 37 and 43. Fig. 47 is a side view of the part shown in Fig. 46. Fig. 48 is a vertical sectional view of certain parts of the apparatus, and taken in line $a^*\ a^*$ of Figs. 1, 37, and 43. Fig 49 is a detail sectional view taken in the line $b^\times\ b^\times$ of Fig. 48. Fig. 50 is a plan view of the parts shown in Fig. 49. Fig. 51 is a perspective view of the end of the apparatus taken from a stand-point at one corner thereof and at an angle of about forty-five degrees, and intended to illustrate various co-operating parts of the apparatus, exclusive of the framework by which they are held or supported in position for operation. Fig. 52 is a perspective view of a certain lever included in the mechanism. Fig. 53 is a detail view illustrating the manner in which the needles of the embroidering-machine are gripped and held in the gripping-jaws thereof, and Fig. 54 is a perspective view of the parts represented in Fig. 4, and taken to represent the machinery in full lines somewhat higher than the line $c\ c$ in Figs. 1, 2, and 3. Figs. 55 and 56 are detail views or diagrams illustrating in detail the various circuit-wires included in certain features of my said invention.

In the drawings aforesaid, Figs. 1, 2, 3, 4, 5, and 6 are on a scale one inch to the foot. Figs. 7, 8, 9, 10, 12, 13, 14, 18, 19, 20, 31, 32, 33, 34, 37 to and including Fig. 50 are on a scale of four inches to the foot. Fig. 11 is on a scale two inches to the foot. Figs. 21 to and including 28 are on a scale of three inches to the foot. Figs. 29, 30 are on a scale of six inches to the foot. Figs. 15, 16, 17, 35, 36 are on a scale of eight inches to the foot. These are the proportions of a working apparatus; but the invention is not limited to any special proportions of the parts, as the same may be varied widely.

The tambour-frame is arranged to move in relation to the two sets of needles, their supporting-carriages, and the mechanism for drawing the needles through the fabric in substantially the same manner as in the well-known Heilmann or Lewis machine, ordinarily operated by manual labor.

The construction and operation of a machine embracing the several combinations included in said invention are as follows:

A is a driving-shaft, which is provided with a pulley, $a^2$, or other means for actuating the same, and with a worm, $b^2$, which latter meshes into the teeth of a horizontal gear-wheel, B. Fast upon this gear-wheel B, so as to rotate therewith, is a horizontal cam, C, which is formed of a deep groove, $c^2$, with walls $d^2$ of corresponding shape. This cam C has a heart-shaped portion, $e^2$, and opposite the latter a circular portion, $f^2$, concentric with the axis of motion of the gear-wheel B, and consequently of the cam C, as more fully illustrated in Fig. 4.

Arranged in line with each other on opposite sides of the cam C are two horizontal bars, D, upon the under side of the outer end portion of which is a rack, $a'$, while projecting downward from the inner end portion of each of said bars D into the groove $c^2$ of the cam C, is a cylindrical stud or pin, $b'$. The two bars are supported in suitable guides or bearings, $c'$. The rotation of the cam C gives an alternating reciprocating rectilinear movement to the two bars D, so graduated that when one of the said bars is in motion the other will be stationary. This follows from the fact that while the heart-shaped portion $e^2$ of the cam C is actuating one of the said bars the other of the said bars is controlled by the semicircular or concentric portion $f^2$ of said cam.

Under each of the racks $a'$ is a toothed pinion, $g^2$, which meshes with the teeth of one of the said racks, so that the reciprocating movement of the bars communicates a rotary movement in alternately opposite direction—that is to say, a substantially rocking movement to the shafts E of the pinions $g^2$. These shafts are parallel, or substantially so, with the driving-shaft A, as indicated more fully in Fig. 4.

Upon each shaft E is a toothed sector, A', more fully shown in Figs. 1 and 4, and which gears into an adjacent toothed pinion, $h^2$, which is fast on the sleeve $i^2$, as more particularly shown in Figs. 4, 21, and 22, of a clutch, B', on a shaft, C'. This clutch on each of the shafts C' is so constructed and arranged as to connect or disconnect with the said shaft at the requisite times and in the requisite relation with certain other parts of the apparatus, as hereinafter fully set forth. This clutch is more fully represented in Figs. 1, 21, 22, and 23. The shaft C' is passed through the sleeve $i^2$ of the clutch, and has attached to its outer end a block, $A^2$, which lies parallel with and close to the face $k^2$, as shown in Figs. 21 and 22. Pivoted, as shown at $q^2$, to this block $A^2$ is a sector, E', which may consist of two or more teeth, as represented in Fig. 21, and on occasion meshes or gears with a tooth, $l^2$, which projects inward from the rim $m^2$ of the clutch. From this sector E' extends an arm, $n^2$, to which is pivoted one end of a toggle-joint, F', the opposite end of which, as shown at $z^2$, is pivoted to the block $A^2$. The outer end of the shaft C' is longitudinally bored to receive a sliding bolt, $B^2$, behind which and pressing the same longitudinally in an outward direction is a spring, $c^4$.

Formed transversely in the shaft C', and communicably with the inner end of the bore thereof, is a slot, $r^2$. Around the shaft C', at the locality of this slot $r^2$, is a sleeve, $s^2$. A horizontal counter-shaft, $C^2$, placed in a position at right angles to that of the shaft C', but below the same, as shown in Fig. 21, has a radial arm, $t^2$, which, by means of a yoke, $t'$, and pins $t^3$, connect with the sleeve $s^2$. Projecting inward from this sleeve through the slot $r^2$ in the shaft C' and into a suitable hole or socket in the bolt $B^2$ is a pin or key, $u^2$, so that a rocking or vibratory movement of the counter-shaft $C^2$, acting through the arm $t^2$, gives a sliding or longitudinal movement in an inner direction to the bolt $B^2$, the reverse or outward movement being given on occasion to said bolt by means of spring $c^4$. The outer end of this bolt has a lip or shoulder, $a^4$. When the parts are in position to connect the clutch to the shaft C', and thereby actuate the same by the movement of the clutch secured through the pinion $h^2$, the parts will have the position shown in Figs. 21 and 22, the lip or shoulder $a^4$ being projected behind the central joint, $b^4$, of the toggle-joint F', thereby straightening the same and holding the sector E interlocked with the tooth $l^2$, and thus connecting the clutch with the said shaft, so that the movement of the former will be transmitted to the latter. When the lever $t^2$ is operated by the counter-shaft $C^2$ to draw inward the bolt $B^2$, the lip or shoulder $a^4$ is withdrawn from behind the central joint, $b^4$, of the toggle-joint F, whereupon the toggle-joint bends or folds on the said central joint, $b^4$, and the tooth $l^2$ slips from the sector E', thereby disconnecting the clutch from its hold on the shaft C', so that the movement of the clutch ceases to be transmitted to the said shaft. In the reverse movement of the clutch the tooth $l^2$ re-engages with the sector E' and straightens the toggle-joint, the central joint, $b^4$, of which striking the sloping-end surface $J^2$ of the bolt $B^2$, presses the same inward and passes the lip or shoulder $a^4$ of the bolt, thus permitting the same to move outward by the pressure of the spring $C^4$, and its lip or shoulder $a^4$ is again brought behind the central joint, $b^4$, of the toggle-joint to again lock the clutch with the shaft C'.

Below the sector E' is a spring, $a^*$, which is attached to the block $A^2$, and which has a wedge-shaped tooth, $b^*$, on its free end, which presses against the rounded surface at the under side of the sector. When the teeth of the sector are thrown out from the tooth $l^2$, as described, the tooth $b^*$ of the spring $a^*$ catches in a notch, $c^*$, in said under side of the sector and prevents the same from swinging out of the position, as indicated in Fig. 1, at the right-hand side thereof, requisite to the reversed action of the tooth $l^2$ upon the sector E' at the proper time.

On each of the shafts C' is a pulley-faced disk, D'. Each of these disks D' has attached to it the two ends of a strap, G', which is preferably of sheet metal—as, for example, flexible sheet-brass. This band passes over pulleys $w^2$, and connects to the adjacent needle-carriage H', as shown at $g^1$.

For convenience in construction the strap may be in two parts, the upper ends of which are attached to the needle-carriage at $g^1$, as aforesaid. When the shaft C' is turned in one direction, the strap G' will operate to draw the needle-carriage outward upon its ways or guides I', and when turned in the reverse direction will of course operate to move said carriage inward.

In order that either half or portion of the strap may be strained or longitudinally adjusted, its end is attached to the disk D', as represented in detail in Figs. 24 to 30, inclusive. Figs. 25 and 26 show the parts situate in the line $n\ n$ of Fig. 24, and Figs. 27 and 28 those situate in line $p\ p$ of said Fig. 24, the difference in the devices being such as to permit the strap to cross-part itself, as indicated in Fig. 1.

Having reference more particularly only to Figs. 25 and 26, the rim of the disk is formed with a transverse hole or socket, in which is placed a bolt, $h^4$, which is held in place by a radial set-screw, $i^4$, the inner end of which crowds upon the circumference of the bolt $h^4$, as indicated in Fig. 26. This bolt has a larger portion, $h^3$, (see Fig. 29,) upon which bears the set-screw $i^4$, as just described, and a portion, $i^3$, of lesser diameter, which is longitudinally split or divided, as shown in Figs. 29 and 30, in order to receive the extremity of the strap, which enters to said bolt through a suitable opening in the periphery of the disk. The extremity of the strap being thus attached to the bolt, the strap may be tightened or adjusted by winding its extreme portion upon or around the bolt, this being done by axially turning the bolt, which may be done by means of a wrench applied to its squared head $j^3$.

The bolt, as constructed and applied for use at the opposite end of the strap G', at the line $p\ p$ of Fig. 24, is substantially the same as above described, except that, as shown in Figs. 27 and 28, the part with diminished diameter is adjacent to the squared head of the bolt. The different portions of the latter are indicated on Figs. 27 and 28 by the same reference-letters as in Figs. 25 and 26.

Upon each of the shafts C' is a brake apparatus, $J^*$, as more fully indicated in Fig. 4, the construction of which is more fully illustrated in Figs. 31 to 36, inclusive.

Fast on the shaft C' is a disk, K', which is provided with a peripherical flange, $a^3$. This disk rotates within a shell, L', through which passes the said shaft C', the shell being supported by said shaft and capable of a rocking movement thereon. This shell has an arm, $b^3$, upon the outer end of which is a cylindrical socket, $c^3$, through which passes a screw, $d^3$. This screw $d^3$ screws into a nut, $e^3$, below, and passes through the bottom of the socket, as shown in Fig. 31. The nut $e^3$ is pivoted to a fixed block, $e^4$, below, in order to permit a slight swinging movement of the screw $d^3$ during this vertical movement of the arm $b^3$. Between the head of this screw and the bottom of this socket is a spring, $v^3$, which tends to depress the arm $b^3$.

Placed upon the cylindrical boss $f^3$ of the shell L is a flat collar, M', which has a radial arm, $g^3$, and which is formed with arc-shaped slots $w^3$, the curvature of each of which is concentric with the axes of the shaft C'.

In the shell K' are radial recesses $i$, the form and character of which are more clearly shown in Fig. 35. In each of these is a pawl, I*, the outer end of each pawl being pivoted in the outer end of the recess $i$, in which it is placed, as shown, by pivot $s^3$ in Figs. 31, 32, 34, 35, and 36. Behind each of said pawls is a spring, $r^3$, which, for convenience of construction and efficiency of operation, may have the greater portion of its length placed within a circular recess on the back of the adjacent pawl I*, as shown in Fig. 35. Each pawl I* has a laterally-projecting stud or threaded pin, $l^3$, which projects through an adjacent opening, $m^3$, as indicated in Fig. 32, and also through the adjacent and partially-coincident slot, $w^3$, as more fully indicated in Fig. 33, of the flat collar M'.

In order that the parts may not be liable to disarrangement, a nut, $n^3$, as indicated in Fig. 32, may be placed upon the outer end of each stud $l^3$, so as to rest lightly against the adjacent outer surface of the collar.

Each of the pawls I* has a square notch, $o^3$. The flange $a^3$ of the disk K' is arranged in these notches. When the flat collar M' is turned so that the ends of its slots $w^3$, Fig. 33, act upon the studs $l^3$, Fig. 32, to keep them in such position that the sides of the notches are substantially parallel with the surfaces of the flange $a^3$, the rotation of the disk K' is not interfered with; but when the disk is turned in a reverse direction to relieve the pawls the latter are moved by springs $r^3$ until the edges of the notches grip the opposite sides or surfaces of the flange $a^3$, as more fully shown in Fig. 35, and this simultaneous gripping of the flange at several points along its periphery effects an almost instantaneous stoppage of the rotation of said flange and the disk, and consequently of the shaft C', to which it is attached. The jar incident to this stoppage is taken up by the rocking of the shell upon the shaft C', which rocking movement is cushioned by the resistance of the spring $v^3$. A suitable bearing, $w^3$, may be arranged to receive and support the cylindrical boss $f^3$ of the shell L', and in a proportionate degree the shaft C'. A stop, $f^4$, may be provided to limit the downward movement of the arm $b^3$.

The means by which the flat collar M' is actuated and the purpose of the brake mechanism is hereinafter fully set forth. The movements of the needle-carriages being carried and controlled by the rocking movement of the shafts E, transmitted through the mechanism hereinbefore described, and the extent of the movement of the shaft E being uniform, it follows that if no provision were made for varying the movement of the said carriages to and from the tambour-frame the movement of said carriage would be in like manner always uniform, and no provision would exist for graduating the movement of the carriages to the gradually shortening length of the yarn or thread used in the embroidering operation. In order to provide for this, provision is made to actuate the clutches B' at proper intervals, to loose the shafts C' from the action of the shafts E at the moment the carriages recede, each in its turn, the available length of the yarn or thread, this release of the shafts C'—or, in other words, of the needle-carriages—being automatically produced as follows: On the shaft $m^4$, as indicated in Fig. 4, is a rocking block, $A^6$, as indicated in Fig. 12, which has a sloping notch, $a^5$, as indicated in Fig. 18, and which carries a contact piece or surface, $b^5$, composed of any suitable conductor of electricity, and while attached to and carried upon the block $A^6$ is insulated therefrom by the interposition of any suitable non-conducting substance. The purpose of this contact piece or surface will hereinafter presently appear. $B^6$ is a pawl the upper end of which, at one corner, catches, on occasion, in the sloping notch $a^5$ of the rocking block $A^6$. This pawl has an arm, $c^5$, to which is connected a spring, $d^5$, which tends to hold said pawl in contact with the rocking block $A^6$. $C^6$ is an armature pivoted at its outer end, and having its inner end shaped and arranged to catch, on occasion, against a shoulder, $e^5$, on the end of the pawl $B^6$. Above the armature is an electro-magnet, $D^6$, which is suitably suspended from the adjacent portion, $E^2$, of the frame of the machine, and by any suitable means is insulated therefrom. Attached to the adjacent portion of the frame $E^2$, and consequently insulated from the electro-magnet $D^6$, are two metallic contact-strips, $F^2$, which are insulated from each other and from the frame of the machine. (More fully represented in Fig. 13.) The current-wire $g^5$ connects direct with the battery shown at $G^2$ in Fig. 1, and which may be of any ordinary or suitable kind. The said circuit-wire $g^5$ after passing from the magnet connects directly with the contact-piece $F^2$, as more fully indicated in Fig. 12. The contact-piece $b^5$ on the rocking block $A^6$ is so arranged that when said block is swung upward, as shown in Fig. 12, it will establish metallic connection between the two contact-strips $F^2$. It is to be observed that the electro-magnets and their accessories, like the shafts E and their accessories, are in duplicate, one set or system at each side of the machine, and each intended to act in conjunction with one of the needle-carriages. Each shaft $C^2$, as represented in Figs. 14, 15, 16, and 17, is adjacent to one of the shafts $C'$, as indicated in Fig. 4, and below said shaft and the shaft $m^4$, and in a portion at right angles thereto, as shown in Fig. 4. Each of these secondary shafts, as represented in Figs. 14, 15, 16, 17, 21, and 23 is provided or connected with mechanism, as follows, to wit: Upon the said shaft $C^2$ is a socket-arm, $h^5$, in which, as shown at $i^5$, (see Figs. 14, 15, 16, and 17,) is pivoted a peculiarly-shaped pawl, $H^2$, its upper end being of a double-convex-lens shape in its cross-section, as shown in Fig. 17. The said pawl has at its lower end an arm, $j^5$, in which is a socket, which secures a spring, $k^5$, which forces downward and outward a stem, $l^5$, the enlarged lower end or knob of which bears against the adjacent shouldered surface of the socket-arm, as shown more fully in Fig. 16, thereby tending to keep the main or upper portion of the pawl $H^2$ upright and resting against the back of the lever $h^5$, as represented in said Fig. 16. On the shaft $m^4$ is a downwardly-projecting arm, $I^2$, the lower end of which has in its cross-section a double-convex-lens shape, corresponding to that of the adjacent upper end of the pawl $H^2$. When the shaft $m^4$ rocks or vibrates in one direction, one of the inclined or sloping side surfaces of the said end of the lever $I^2$, acting upon the corresponding and contiguous surface of the end of the pawl $H^2$, moves the said pawl in the direction of the back of the lever $h^5$, and thereby moves said lever backward, and consequently turns the shaft $C^2$ to a corresponding degree. This shaft $C^2$ being connected, as hereinbefore explained and shown in Figs. 21 and 23, with the sliding bolt $B^2$, the just described movement of the said shaft draws back the said bolt and by withdrawing the lip or shoulder $a^4$ from underneath the central joint, $b^4$, of the toggle-joint $F'$, releases the clutch to disconnect the same from its grip or holding action on the shaft $C'$. In the reverse movement of the lever $I^2$ the pawl $H^2$ yields to permit the said lever $I^2$ to pass without affecting the shaft $C^2$. As soon as the sloping surface aforesaid of the lever $I^2$ has passed that of the pawl $H^2$, after causing the requisite movement of the shaft $C^2$ and the release of the clutch, as aforesaid, the spring $c^4$ forces outward the bolt $B^2$ to its original position. It is to be observed that the outer end of said bolt, below the lip or shoulder $a^4$, is sloping or inclined, as shown in Fig. 21, in order that the bolt may recede inward from the sliding pressure of the toggle-joint $F'$ when the same straightens in re-locking the clutch to the shaft $C'$, as hereinbefore explained. After the toggle-joint has thus straightened, the spring $c^4$ forces the bolt outward until its lip or shoulder $a^4$ is brought below the central joint, $b^4$, of said toggle-joint. Upon the rear end of the shaft $m^4$, as indicated in Figs. 1 and 4, is a crank-arm, $m^5$, which connects, by a rod, $n^5$, with a crank-arm, $o^5$, on a horizontal shaft, $r^5$, upon the opposite or rear end of which is a crank-arm, $s^5$, which, by a rod, $t^5$, connects with the upwardly-extending arm $g^3$ of the flat collar M of the brake mechanism hereinbefore explained. The motive power for this action is the spring $s^4$, which, by means of the rod $o^4$, lever-arm $n^4$, and shaft $m^4$, acts upon the arm $I^2$ to give the required movement thereof. When the electro-magnet $D^6$ has actuated the armature $C^6$, and mechanism acting in conjunction therewith, to release the carriage from its moving power, the said mechanism is of course to be set back in its former position, which is produced as follows: Upon each shaft E is a crank-arm, $u^4$, which has at its extremity a lateral pin or stud, $v^4$, which latter fits into the fork $w^4$ of an elbow-lever, $j^4$, the opposite arm of which connects, by a rod, $k^4$, with a lever-arm, $y^4$, on the shaft $m^4$, to the end of which is attached the lever-arm $n^4$. When the carriage is released from its outward movement, and the rock-shaft E reverses the direction of its motion, the lever-arm $u^4$, by means of the rod $k^4$, lever-arm $y^4$, shaft $m^4$, and lever-arms $n^4$, presses the spring $s^4$ and sets the block $A^6$ back in its former position. In order to allow the end of the rod $k^4$ to act freely from each other, said rod is provided with a loop, $n'$.

$A^7$ is the tambour-frame, which carries the fabric or fabrics upon which the embroidery is to be formed, this frame $A^7$ being of any ordinary or usual construction, and preferably constructed to carry duplicate fabrics, $B^7$—one above and one below—to be acted upon by duplicate or upper and lower sets of embroidering-needles, $C^7$, and their accessories. The tambour-frame is capable of movement in any direction in its own plane, and is supported and arranged, and is actuated to move vertically or horizontally, or any combined movement of the two, by the means and mechanism usual in the well-known Swiss or Heilmann machine, or by any other suitable means or mechanism. Inasmuch as the devices and mechanical arrangements usual for said purposes, as well as the pantograph for guiding the operator in giving movement to the tambour-frame as constructed, are applied in the Swiss machine and generally known and constructed in the art, no special description of them is here necessary.

$I'$ are horizontal guides or ways. (Shown in Figs. 1, 2, and 3, and indicated on a larger scale in Figs. 37, 43, and 48.) These guides are duplicated at opposite sides of the machine—that is to say, one set of said guides at one side of the tambour-frame and the other set at the opposite side thereof, as shown more fully in Fig. 3. These guides support the two carriages $H'$, which carry needles, $C^7$, and their immediate accessories. Each carriage comprises a bar, $D^7$, extended parallel with the tambour-frame $A^7$, and having at each end a truck, $a^7$, provided with grooved wheels $b^7$, which run on the guides I′, so that the carriages may be moved inward toward and outward away from the tambour-frame, this inward movement of each carriage alternating with that of the other, as hereinafter presently more fully explained. In practice the bar D⁷ should be made hollow, in order to avoid excessive weight. The needles C⁷ and their immediate accessories are connected with the bar D⁷ by vertical standards E⁷, one set of needle-gripping devices being attached to the upper part of the bars E⁷ of each carriage and the other set of said devices near the lower end of said bars of each carriage, as indicated in Fig. 3.

Each set of needle-gripping devices is constructed as follows: A horizontal bar, F⁷, is supported upon brackets c⁷, projecting from the vertical bars E⁷. Upon this bar is fixed a series (shown in Fig. 2) of horizontal jaws, d⁷, which project inward toward the tambour-frame, as indicated in Fig. 3. To each of said fixed jaws, or, what is substantially the same, to the bar F⁷, in due relation with each fixed jaw d⁷, is pivoted a jaw, f⁷, movable with reference thereto, and arranged to act in conjunction with the fixed jaw to alternately grip and release a needle, as hereinafter more fully set forth. Each jaw f⁷ has an arm, f⁸, which extends outward from the jaw itself, and is pressed upward by a suitable spring, (see Fig. 53,) so that the said jaw f⁷ may be pressed down upon the fixed jaw d⁷ to grip the needle. Working in bearing g⁷, provided on the brackets c⁷, is a long eccentric, S⁸, which extends above the arms f⁸ of the movable jaws f⁷ in such manner that said eccentric, when turned in one direction, will depress said arms to lift the jaws f⁷, and when turned in the opposite direction will release said arms to permit the movable jaws f⁷ to be pressed down upon the fixed jaws d⁷, to grip the needles, as aforesaid. The eccentric is provided at each end with a backwardly-projecting lever, h⁷. The said levers of the upper and lower eccentrics, provided, respectively, to the upper and lower series of jaws at each side of the machine, are connected by a vertical bar, G⁷, so that by the vertical movement of said bar the two eccentrics — viz., the upper and lower — are operated in unison. Projecting laterally from each bar G⁷ is a pin or wrist, i⁷. This may be made vertically adjustable in the said bar—as, for example, by fitting it into a slot and providing it with means for tightening it in place at points along the length of the slot. Arranged in due relation with the lower end of each bar G⁷ is a vertically-sliding bar, I⁷, which works through fixed guides of any suitable construction—such, for example, as shown at j⁷. The lower end of this sliding bar I⁷ is pivoted to a lever, J⁷, on a shaft, K⁷. In the upper end of the sliding bar I⁷ is a deep notch or open-ended slot, k⁷, calculated to receive the pin or wrist i⁷ when the adjacent carriage is moved inward nearly to its limit toward the tambour-frame. When the carriage is thus moved inward toward the tambour-frame, the pin or wrist i⁷, passing into the slot k⁷, as aforesaid, temporarily connects the vertical bar G⁷ with the sliding bar I⁷, so that a vertical movement given to the latter is communicated to the former.

The construction and arrangement above set forth of the needle gripping and releasing mechanism and the relation of the same to the carriages are the same as in the well-known Swiss or Heilmann embroidering-machine, wherein two carriages are alternately moved inward and outward. The double-ended needles, of the usual kind and character, are held in the gripping devices of the carriages at one side of the machine, and are thrust through the fabrics on the tambour-frames by the inward movement of said carriages. Meanwhile the carriages at the opposite side of the machine have remained close to the opposite side of the tambour-frame and with jaws opened until the adjacent end of the needles protruding through the fabrics are brought within the said jaws, whereupon the latter are closed by the movement given to their actuating-eccentric S⁸ through its lever h⁷, the bar G⁷, sliding bar I⁷, and lever J⁷, thereby gripping the said end of the needles. Simultaneously with this the jaws of the first-named carriages are opened by the reversed action of their actuating mechanism, to permit the reverse movement of the carriages on the opposite side of the tambour-frame, to draw the needles quite through the fabric and beyond to the distance requisite in forming or closing the stitches of all the needles. This done, the movement and action of the carriages are again reversed and the operation is repeated, the needles being drawn through the fabric from the opposite direction, and so on alternately from side to side from the successive movement of the carriages and needle gripping and releasing mechanism, as set forth.

The means by which I provide for the automatic operation of the needle gripping and releasing mechanism are as follows, it being understood that my invention comprises also in this connection any equivalent of the mechanism here described in connection with the needle gripping and releasing mechanism for the purpose specified: At the under side of the worm-wheel B, as shown more fully in Fig. 2, is a horizontal cam, most conveniently constituted in the form of a groove, L⁷, of suitable shape, formed in the cylindrical circumference of a flat disk. This cam is secured to or formed in one with the said worm-wheel B, so as to rotate therewith. The operative portion or incline of this cam is shown at m⁷. M⁷ is a horizontal rock-shaft, the portion of which is more fully shown in Figs. 2 and 4, (see also Fig. 3,) and which works in fixed bearings, and which at its inner end has a crank-arm, n⁷, the wrist-pin n⁸ of which is projected into the groove or cam L⁷, as more clearly illustrated in Fig. 2, so that the said cam will alternately and at due intervals raise and lower the crank-arm, and consequently rock the shaft M⁷. At the opposite or outer end of said shaft, as more clearly indicated in Fig. 1, is a second crank-arm, $r^7$, to the upper end of which is pivoted or otherwise provided a link or catch, $s^7$, the opposite end of which catches upon a pin or stud, $t^7$, provided on the lower arm, $u^7$, of a T-lever, P⁷, which is itself pivoted, as shown at $v^7$ in Fig. 1, to a fixed pivot. Upon the adjacent ends of the shafts K⁷ of the levers J⁷, (from which the needle gripping and releasing mechanism of the two carriages is actuated, as hereinbefore explained,) are lever-arms $a^8$, as shown in Fig. 1. The outer ends of these crank-arms $a^8$ are provided with wrist-pins, $b^8$, which pass into slots in the outer ends of the cross-arms $c^8$ of the T-lever P⁷, so that the movement of the said T-lever is through the crank-arms $a^8$, shafts K⁷ and J⁷, transmitted to the sliding bars I⁷, to operate the needle gripping and releasing devices when the carriages are moved inward, as hereinbefore set forth, said needle-actuating mechanism being thus automatically operated and controlled by the cam L⁷. It will be observed that, inasmuch as one of the cross-arms $a^8$ are actuated alternately in opposite directions to cause the needle-gripping devices at one side of the tambour-frame to release the needles, the corresponding devices at the opposite side are operated to grip the needles preparatory to drawing them through, as hereinbefore explained.

For convenience of construction the T-lever P⁷ may have its two parts—viz., the lower arm, $u^7$, and cross-arms $c^8$—made separately and united by having their inner ends pivoted to the common pivot $v^7$, and with set-screws $e^8$ (see Fig. 1) passing upward through lateral shoulders upon the arm $u^7$ and bearing against the under sides of the cross-arms, as represented in Fig. 1, by which means the lower arm, $u^7$, may be readily adjusted to the exact angle and position required with reference to the cross-arm $v^7$.

In order to give stability to the worm-wheel B, the cam C, and the cam L⁷, which move together, as hereinbefore explained, the said parts are preferably formed of a single casting, at or through the center of which is a large circular bore or socket into which fits the fixed cylindrical boss R⁷, as shown in Fig. 3, and which is supported upon the floor or other suitably-strong support and firmly bolted or otherwise secured thereto. To avoid the excessive weight, the castings comprising the aforesaid worm-wheel B and cams C and L⁷ are hollowed, as shown at $d^8$, thereby forming a sleeve, $e^{18}$, between said hollow and the bore of the castings. The lower edge of this sleeve fits freely in a groove, $g^8$, at the base of the cylindrical bearing R⁷ and concentric therewith. This groove serves to prevent the undue escape of the lubricant at the bearing aforesaid. The thread or yarn of each needle has of course one of its ends attached to the needle and the other to the fabric upon which the embroidery is being formed, this course of the thread, which is the same for each needle, being shown in the dotted line $h^8$ in Fig. 1. The threads pass off all the needles underneath a tension-bar, S⁷, which extends parallel with the series of needle gripping and releasing jaws, said tension-bar being supported upon the extremities of arms $i^8$, which at their opposite ends are pivoted to the contiguous ends of the adjacent carriage by means of a shaft, A*, which is supported in bearings provided to the carriage, and is in a position parallel with the tension-bar S⁷, aforesaid. These bearings are preferably formed at the inner ends of arms or standards A**, affixed to the carriage, as shown in Fig. 37. The weight of the tension-bar therefore rests upon the series of threads, and when the carriage is drawn outward in completing the stitches the strain exerted upon the threads by the weight of the bar insures a uniform tension to the threads, and consequently a uniform tightness to the stitches, the completion of the latter being indicated by the slight lifting of the bar. Inasmuch as the backward movement of each carriage cannot exceed the length of the threads of its needles, and inasmuch as this length is shortened by each successive stitch, it is necessary that from the first filling of the needles until the supply of thread thereto is exhausted each successive backward movement of the carriages must be shorter than the one immediately preceding. The means by which I render this automatic are as follows, it being observed that I do not limit myself to the precise devices described, inasmuch as various mechanical equivalents so far as concerns the principal features of said portion of my said invention may be employed instead: At the upper part of each carriage and attached to the shaft A* of said carriage is a sector, T⁷, the upper part, $j^8$, of which has its outer surface of metal, in other words of some conductor of electricity; but the lower part of said sector has its surface formed of vulcanite or other non-conductor of electricity, as indicated at $k^8$, in Figs. 43 and 48, but insulated therefrom by an interposed non-conductor of electricity. As indicated at $m^8$, are two parallel metallic springs V⁷, which are placed a short distance apart, so as to be insulated from each other when the carriage is moved outward to the available limit of the remaining length of the thread—in other words, until the strain on the threads lifts the tension-bar S⁷. The upward movement of the latter depresses the sector T⁷, thereby bringing the insulated surface $k^8$ of said sector away from its contact with the springs V⁷ and bringing the metallic or conducting surface $j^8$ of said sector in contact simultaneously with both of said springs, thus establishing electrical connection between said springs, the current flowing from one to the other of said springs, and thus closing the circuit to set in operation the electro-magnet D⁶ to draw upward the armature C⁶, which latter, acting by closing the electric circuit through the metallic surface of said sector and the springs V⁷, is practically instantaneous in its operation. It follows that the out movement of the carriages is automatically limited to the actual length of the threads, and diminishes in the exact ratio that the threads are shortened by the formation of the successive stitches. This control of the outward movement of the carriages is much more exact than can be obtained by any method very commonly in use, which depends upon the skill, care, volition, constant attention, and personal action of the attendant, any carelessness or oversight on the part of the latter being liable to cause the breaking of the threads. Furthermore, the movement of the carriages being in my invention automatically limited by the strain or tension on the threads, it follows that the tension exerted upon the stitches is rendered more uniform, and the embroidering, through mechanism hereinbefore described in connection therewith, actuates the clutch B' to release spur-pinion $h^2$ from its fast condition upon the shaft C', thereby permitting the rotation of the latter to cease, and consequently the outward movement of the carriage, the same movement of the armature applying the brake J* to stop the rotation of the shaft C', which would otherwise continue from the momentum of the said shaft. The connection of the said brake with the armature is hereinbefore described. It is of course to be understood that there is a separate and distinct electro-magnet, armature, clutch, and brake, with suitable appurtenant devices, as described, for each carriage. Inasmuch as the sector T⁷ is automatically actuated by the threads when the carriage has receded their length (whatever the same may be) from the tambour-frame, and inasmuch as the action of the mechanism set in motion is proportionally improved, it is of course to be understood that when the outward movement of the carriage has ceased its almost immediate inward or return movement, by slightly slackening the threads, permits the weight of the tension-bar to raise the sector, and thus break the electric current as soon as its purpose has been accomplished, as aforesaid.

In order that the upward tilting of the tension-bar S⁷, when the fork $r^8$ acts upon the stud $s^8$ to lift the tension-bar during the passage of the needles through the fabric on the tambour-frame, as hereinbefore explained, may not close the electric circuit aforesaid, and thus disengage the clutch B' at the wrong time, provision is made for breaking the circuit, as follows: Attached to each carriage, as represented in the drawings, at its lower part and at one end thereof, are two suitable springs, A⁸, insulated from the said carriage by the interposition of any suitable insulating material, $a^9$, as shown in Fig. 43, these springs being insulated from each other as well as from the carriage—as, for example, by being placed a little distance apart. One of these springs A⁸, as indicated in Fig. 48, is connected by a wire, B⁸, with one of the springs V⁷, while the other, by a wire, C⁸, connects with the adjacent armature C⁶. The springs A⁸ have their outer ends bent or shaped to bear smoothly against a fixed metallic block, D⁸, attached to the adjacent portion of the frame-work of the apparatus. When the springs A⁸ are thus in contact with the block D⁸, electrical connection is established between said springs, so that the current through the battery-wire E⁸ passes through the springs V⁷, metallic surface $j^8$, of the sector T⁷, wire B⁸, springs A⁸, block D⁸, and wire C⁸ to the adjacent armature, and thence in completed circuit to the battery, this being the course of the current in actuating the mechanism to stop the outward movement of the carriage; but when the carriage is moved in the reverse or inward direction the springs A⁸ move past the end of the block D⁸, and connection being thus broken between them the circuit is broken, and the downward movement next succeeding of the sector T⁷ is not attended by any closing of the circuit or consequent action of the armature.

In order that the insulation one from the other of the springs A⁸ when the carriage is moved inward, as described, may be complete and unattended by any mechanical difficulty, a block, T⁸, of wood, vulcanite, or other non-conductor of electricity, is placed at the end of the metallic block D⁸ in line and with its surface flush therewith, so that the springs A⁸ may pass readily from the one block to the other during the movement of the carriage.

It is to be observed that while I have used the term "springs" for the devices A⁸ and V⁷, inasmuch as a certain degree of elasticity materially promotes their effective working, any devices arranged to produce the same results, irrespective of any elasticity in their operation, are clearly equivalents of the said springs or devices A⁸ and V⁷.

Inasmuch as the automatic limitation of the outward movement of the carriage, as aforesaid, is dependent upon the tension or strain on the threads it is necessary at the beginning of the operation of embroidering, before the threads have become firmly attached to the fabric on the tambour-frame, that means be adopted to control the outward movement of the carriages until the threads have become so securely fastened to the said fabric as to permit the aforesaid tension or strain upon them. This is provided for as follows: Attached to the end of each carriage—as, for example, by a bracket, F⁸, (which may also serve another purpose, as herein presently explained,) is a block, G⁸, of wood or other non-conductor of electricity. This block G⁸ is preferably oblong, and placed in position to move with the carriage in direction parallel with the adjacent guide I'. This block (shown in detail in Figs. 38, 39, and 40) may be attached to the bracket F⁸ (which is more fully shown in Figs. 49 and 50) by screws or other suitable devices. To this block are connected two wires, H⁸ and I⁸, of a separate circuit, which connects with the battery, and includes the adjacent armature—that is to say, the armature connected with the carriage-stopping mechanism at the same side of the apparatus for use in connection with the same carriage. From the wire $H^8$ extends a metallic spring, $J^8$. From the wire $I^8$ extends another metallic spring, $K^8$, which passes over the flat upper side of a bolt, $M^8$, which works in a suitable bearing in the block $G^8$, and is capable of being axially turned, so that its upper side may act as an eccentric to raise the free end of the spring $K^8$, which is preferably bent or looped, as shown at $c^9$, in order that on due occasion it may come into more intimate contact with the spring $J^8$ to complete or close the circuit through the wires $H^8$ and $I^8$. Normally the springs lie apart, so that said circuit is broken. Attached to the adjacent side of the frame of the apparatus, as shown in Fig. 1, is a slide, $L^8$, formed with an inclined or wedge-like portion, $d^9$. This slide $L^8$ may be most conveniently attached in place by a set-screw passed through a longitudinal slot in the slide, and working into a suitable nut formed for its reception in the frame, to which the slide is applied, as aforesaid. The slide being so adjusted that the initial outward movement of the carriage will bring the lower or free end of the spring $J^8$ upon the incline $d^9$ of the slide $L^8$, the said incline lifts the said spring until it comes in contact with the spring $K^8$, thereby closing the circuit through the wires $H^8$ and $I^8$, and, in consequence, actuating the adjacent armature to set in movement and operation the carriage stopping mechanism in the same manner as when the said armature is actuated from the circuit of the wires $C^8$ and $E^8$ $B^8$, as hereinbefore set forth. The slide $L^8$ being properly adjusted, the first outward movement of the carriage will be so limited as to stop before the threads are withdrawn or pulled out from the fabric, thereby preventing their detachment from said fabric. For the next succeeding outward movement of the carriage the slide $L^8$ is moved and adjusted in an inward direction to a degree proportioned to the length of thread to be devoted to the first completed stitch, and so on for succeeding stitches until a sufficient number of stitches have been taken to insure the attachment of the threads to the fabric with sufficient permanence to permit the threads to bear the weight and action of the tension-bar $S^7$. This done, the bolt $M^8$ is axially turned (by means of a cross-handle, $e^9$, in its outer end, as shown in Fig. 40,) to lift the spring $K^8$, so that it will be out of reach of the spring $J^8$ when the latter is raised by the incline on the slide $L^8$. The threads being securely attached to the fabric on the tambour-frame are now capable of lifting the tension-bar, and thus actuating the automatic mechanism for gradually lessening and stopping the outward movement of the carriage, as hereinbefore explained. The extent of the inward movement of each carriage is of course limited by the action of the mechanism by which said movement is imparted, as hereinbefore explained; but to avoid jar and concussion from the too sudden stoppage of the carriage in said inward movement, a buffer or easing device is applied to each end of the carriage. This device comprises a hollow sleeve, $N^8$, attached to the carriage by a bracket, $F^9$, and longitudinally through which works the buffer-rod $P^8$, which is pressed outward by a spring, $f^9$, applied around it within the sleeve, as represented in Fig. 49. The position of these buffer devices is parallel with the direction of movement of the carriage and in such relation with the adjacent portion of the frame that the end $g^9$ of the buffer-rod $P^8$ will strike the same before the carriage completes its inward movement, thereby enabling the spring $f^9$ to soften the jar which otherwise would be incident to the stoppage of the inward movement of the carriage.

In order that each of the carriages $H'$ may have a certain and positive movement when actuated, as hereinbefore set forth, the available length of the straps $G'$, whereby it receives movement from its adjacent pulley-faced disk $D'$, is made adjustable to keep it at the requisite tension. To provide for this, the carriage is provided with a bracket, $Q^8$, the position of which is shown in Fig. 48. In this bracket $Q^8$ is provided a recess or cavity, $h^9$, from which, through the bracket, is passed a bolt, $i^9$, as shown in Fig. 41, the latter a sectional view taken in line $x\,x$ of Fig. 48. The inner end of the said bolt has a head, $j^9$, which is situated within the recess $h^9$. In the extremity of this head is a transverse groove, and at the inner end of this groove the latter is enlarged to cylindrical shape, as shown in cross-section in Fig. 41. The end of the strap $G'$ is folded upon itself, and in this folded condition is thrust into the groove of the aforesaid head, whereupon a key, $l^9$, is driven through the fold, thereby expanding the latter into the cylindrical enlargement at the inner end of the groove, as shown in Fig. 41 aforesaid, and thus securely attaching said end of the strap to the bolt. Any material difference in the length of the strap may be made by varying the length of the loop or fold at the end of the said strap, while the more accurate regulation of the tension of the strap may be made by the longitudinal adjustment of the bolt. The outer end of the said bolt is provided with a screw-thread on which is a nut, $K^9$. The end of the other portion of the strap being suitably attached to the carriage in the position and for the purpose hereinbefore explained, the available length and the tension of the strap may be readily adjusted to the exact degree required by turning the nut $K^9$ one way or the other.

To provide for the attachment of the opposite end of the said strap to the carriage, the bracket $Q^8$, as shown in Fig. 42, a sectional view taken in the line $z\,z$ of Fig. 48, is slotted to receive a longitudinal key, $m^9$, which latter has one of its ends enlarged, as represented at the left hand of Fig. 42 aforesaid. The contiguous end of the strap is folded longitudinally around this end of the key $m^9$ before the latter is driven inward to its place, thereby firmly connecting the said end of the strap to the carriage. To afford additional security, a set-screw, $n^9$, is screwed into the bracket with its inner end pressing against the end portion of the strap, as shown in Fig. 42, aforesaid. It is of course to be understood that the end last mentioned of the strap is to be attached in place before the attachment of the opposite end of said strap is connected by means of the bolt $i^9$, as described.

It has been explained herein that the fork $r^8$, when carried inward by the corresponding movement of the carriage to which it is provided, is acted upon by the pin $s^8$, and thereby raised to lift the tension-bar $s^7$, to raise the same out of the way while the needles are being drawn through the fabric on the tambour-frame and changed from one carriage to the other. In order that the pin may certainly enter the fork when the latter moves inward, as explained, toward the former, it is desirable that the fork should have within certain limits some play or free movement which will insure the entrance of the pin without jar. To this end the fork, instead of being fast upon the shaft A*, is loose or pivoted thereon, and works between two stops, $d^*$, on the ends of the yoke B*, which is itself fast upon said shaft A*, but axially adjustable thereon by means of a set-screw, $e^*$, (see Figs. 46 and 47,) in the hub or boss of the yoke, and arranged to press inward against the shaft to fix the yoke thereon, as just indicated. The inner end of the fork $r^8$ is extended and provided with a stop, $f^*$, which is so arranged as to come in contact with the adjacent arm or standard A** in order to limit the downward movement of the fork. When the carriage draws back from the proximity of the tambour-frame the fork for an instant is free, and then coming in contact with the lower one of the two studs $d^*$ of the yoke B*, depresses the latter, and consequently suffers the tension-bar to reverse its original position. When the carriage moves inward, a slight upward movement of the fork is first permitted, in order that it may be fully entered by the pin $S^8$, whereupon the fork, coming in contact with the uppermost of the studs $d^*$, lifts the same, and consequently raises the tension-bar, as hereinbefore set forth.

The manner in which the movement of the carriages to and from the tambour-frame is secured has been hereinbefore set forth; also, the manner in which the outward movement of the carriages is regulated according to the varying length of the threads. In order, however, that this movement may be without the jar ordinarily incident to changing positive motion, further appliances are provided, as follows: The driving-shaft A, as indicated in Fig. 4, has upon it a fast pulley, D*, which connects, by a belt, $g^*$, as indicated in Fig. 5, with a pulley, E*, fast on a counter-shaft, F*, on which is a loose spur-pinion, G*, and a fast ratchet-wheel, H*. A pawl, $h^*$, as indicated in Fig. 7, on the pinion G*, works in conjunction with the said ratchet-wheel. T*, as indicated in Fig. 5, is a weight from which extends a vertical rack, $i^*$. This is provided with vertical guides—as, for example, slotted shoulders $j^*$, passed upon a fixed vertical rod, $k^*$. This rack is so arranged that in its descent it gears into the pinion G*, as more fully indicated in Fig. 5. To the upper part of the weight T*, by a suitable yoke, are provided two pulleys or sheaves, $n^*$. At $p^*$ is a fixed stop or bracket. Each of the shafts C', which, as hereinbefore explained, give motion to the carriages, has a pulley, O*. From each of these pulleys—as, for example, that indicated at the right hand of Fig. 5—extends a strap, $r^*$, one end of which is fixed to the periphery of said pulley. One of said straps passes under a stationary pulley, $s^*$, then upward over a stationary pulley, $t^*$, thence downward in a looped form under one of the sheaves $n^*$ of the weight T*, thence upward over a stationary pulley, $m^*$, (see Figs. 5 and 54,) and thence downward through a slot in the bracket $p^*$, and terminates in a pendent weight, $w^*$, below said bracket. The other of the straps $r^*$ from the corresponding pulley of the other shaft C' passes under and over like pulleys, is provided with a corresponding weight pendent at its extremity, and is connected with one of the sheaves of the weight T* in the same manner, these parts connecting with said other strap $r^*$ being indicated by the same reference-letters as the parts corresponding in their connection with the first specified of said straps, as fully shown in Fig. 5. As the rack $i^*$ descends, its teeth gear into those of the pinion G*. Inasmuch as the latter rotates with a uniform speed, the constantly-increasing momentum of the rack $i^*$, which would otherwise occur and produce jar and concussion, is moderated, and the downward movement of the rack and the parts connected therewith is rendered uniform. When one of the carriages moves outward, the strap $r^*$ rolls upon one of the pulleys O* on shafts C', thus lifting the weight T*. To permit this the wheel G* is loose on the axle F*, so that it may move in the opposite direction by the lifting of the ratchet $i^*$. When the thread is drawn taut by this outward movement of the carriage the strain on the thread loosens the clutch from the shaft C', and the weight T* at once commences to fall and throws the shaft C' in the opposite direction, and consequently causes the carriage to move inward. It will be observed that when the clutch, which meanwhile moves onward to an extent corresponding to the length of the movement of the ratchet D, clutches in its backward movement the shaft C', which is already in movement, the heavy jar and concussion, which would otherwise occur from said clutch at full speed catching the shaft C' and carriage at rest is prevented. When the weight T* descends, actuating the shaft C' to pull the carriage inward, this motion would of course be accelerated if the increasing momentum of the weight were not retarded. To prevent this there is provided the spur-wheel G* on the shaft F* of the pulley E*, which also carries the spur-wheel H*, (see Figs. 7 and 8,) said shaft receiving a constant movement from the driving-shaft A by means of the strap $g^*$. The ratchet $i^*$ gears into the spur-wheel G*, so that the weight T* connected with said ratchet descends with a uniform or constant speed. The spur-wheel G* is loose on the shaft F*, and moved by the ratchet-wheel H* in one direction to permit its free movement in the opposite direction when the weight T* is lifted, being permitted by the lifting of the pawl $h^*$.

Under some circumstances the electric circuit, electro-magnet, &c., for actuating the armature $C^6$, can be substituted by any suitable mechanical device—as, for example, a thread affixed to said armature and arranged to actuate the same through the motion of the tension-bar $S^7$, when this is raised by the strain or stress of the yarn used for the embroidering. As concerns the circuit-wires, it is of course to be understood that each is to be suitably insulated, in order that the current through the same may not be diverted from its proper course or purpose. Where several of the wires through a portion of their length run parallel with each other, the same, properly protected from each other by insulating material, may be placed together in, so to speak, a cable, which will enable them to be more securely retained in position. Thus, for example in Figs. 1, 2, 37, 43, and 48 the wires $H^8$, $I^8$, $E^8$, and $C^8$, where the same can run parallel, are placed together in a cable, as aforesaid, and they are collectively indicated by their collective reference-letters. Each of the circuit-wires is separately shown in Figs. 55 and 56. As indicated in these figures, the wires may be supported by suitably-insulated hooks or brackets from the ceiling $V^8$ of the room in which the apparatus is placed.

What I claim as my invention is—

1. The combination, with a tambour frame and needle-carrying carriages, of the horizontal cam C, bars D, and mechanism, substantially as described, for transmitting the alternating movement of the said bars to the said carriages, all substantially as and for the purpose herein set forth.

2. The combination, with the tambour-frame and needle-carrying carriages, of the cam C, the bars D, pinions $g^2$, rock-shafts E, and mechanism, substantially as herein described, for transmitting alternating movements from said rock-shafts to the needle-carrying carriages, all substantially as and for the purpose herein set forth.

3. The combination, with the tambour-frame and needle-carrying carriages, of the cam C, bars D, pinions $g^2$, rock-shafts E, rock-shafts C', mechanism, substantially as described, connecting the rock-shafts E with the rock-shafts C', the pulley-faced disks D', pulleys $w^2$, and straps G', arranged to transmit motion from the said disks to the carriages, all substantially as and for the purpose herein set forth.

4. The combination, with the tambour-frame and the needle-carrying carriages, of the pulleys $w^2$, the straps G', pulley-faced disks D', and mechanism, substantially as described, for actuating said disks to move the carriages alternately to and from the tambour-frame, all substantially as and for the purpose herein set forth.

5. The combination, with the tambour-frame and needle-carrying carriages, of the pulleys $w^2$, the straps G', pulley-faced disks D', rock-shafts C' and E, pinions $g^2$, bars D, gearing to connect the rock-shafts C' E, and mechanism for operating, substantially as described, the bars D alternately to give movement to the rock-shafts E, all substantially as and for the purpose herein set forth.

6. The combination, with the tambour-frame and needle-carrying carriages, of the cam C, bars D, pinions $g^2$, rock-shafts E and C', toothed sectors A', and pinions $h^2$, connecting said rock-shafts and pulley-disks D', devices for connecting the pinions $h^2$ with the pulley-disks D', straps G', and pulleys $w^2$, all substantially as and for the purpose herein set forth.

7. The combination, with a tambour-frame, a needle-carrying carriage, and a shaft from which motion is communicated to said carriage, of a clutch mechanism arranged to engage and disengage said shaft from its connection with said carriage, an electric circuit-breaker, and an electric wire or connection, whereby the clutch mechanism may be operated synchronously with the movement of the carriage to and from the tambour-frame, substantially as and for the purpose herein set forth.

8. The combination, with a tambour-frame, a needle-carrying carriage, and a shaft from which motion is communicated to said carriage, of an electric wire, a clutch mechanism constructed and arranged to engage and disengage said shaft from its connection with said carriage, and mechanism, substantially as described, for transmitting motion from the strain and stress of the threads to the said clutch mechanism, to disengage the carriage from the latter, all substantially as and for the purpose herein set forth.

9. The combination, with a tambour-frame, a needle-carrying carriage provided with a tension-bar, $S^7$, arranged to rest in contact with the threads, and a shaft from which motion is transmitted to said carriage, of an electric wire, a clutch mechanism arranged to engage and disengage the said shaft from its connection with said carriage, an electric circuit-breaker, and mechanism substantially as described, for actuating the circuit-breaker by the movement of the said tension-bar, whereby the clutch mechanism is caused to disengage the shaft when the requisite limit of outward movement of the carriage is reached, all substantially as and for the purpose herein set forth.

10. The combination, with a tambour-frame and a needle-carrying carriage provided with a tension-bar, $S^7$, of the sector $T^7$, constructed with an insulated part, $k^8$, arranged to be actuated by the said tension-bar, the conducting springs or devices $V^7 V^7$, an electric wire, and a clutch mechanism arranged to engage and disengage the carriage from its driving mechanism, all substantially as and for the purpose herein set forth.

11. The combination, with the tambour-frame, a needle-carrying carriage provided with a tension-bar arranged to rest in contact with the threads in the needles, and the shaft from which motion is transmitted to said carriage, of a clutch arranged to detach said shaft from its connection with said carriage, a battery or equivalent source of electricity, a system of circuit-wires, a sector, $T^7$, constructed with the insulated surface or part $k^8$, and the springs or devices $V^7 V^7$, said sector and springs or devices being arranged to act to break or close, as the case may be, the current through the circuit-wires, all substantially as and for the purpose herein set forth.

12. The combination, with the tambour-frame and a needle-carrying carriage provided with a tension-bar arranged to rest upon the threads in the needles, of the yoke $B^*$, fast upon the pivotal shaft of the tension-bar, the pivoted fork $r^3$, and the fixed stud or pin $S^8$, all substantially as and for the purpose herein set forth.

13. The combination, with the tambour-frame, a needle-carrying carriage, and the shaft from which motion is communicated to said carriage, of a clutch arranged to detach said shaft from connection with the carriage, an electric circuit, means for closing said circuit to actuate said clutch as the carriage approaches its limit of desired movement from the tambour-frame, and means for breaking said circuit as the carriage approaches the tambour-frame, all substantially as and for the purpose herein set forth.

14. The combination, with the tambour-frame, a needle-carrying carriage, and the shaft from which motion is transmitted to said carriage, of an electric circuit, the conducting strips or springs $A^8$, attached to the carriage, and the insulated bar or surface $D^8$, all substantially as and for the purpose herein set forth.

15. The combination, with the tambour-frame, a needle-carrying carriage, and the shaft from which motion is transmitted to said carriage, of the clutch comprising the block $A^2$, sector $E'$, face $k^2$, tooth $l^2$, sleeve $i^2$, toggle-joint $F$, sliding bolt $B^2$, sleeve $s^2$, and pin or key $u^2$, and mechanism actuating said clutch synchronously with the movements of the carriage to connect and disconnect the latter from the actuating-shaft at the desired limit of its outward movement, all substantially as and for the purpose herein set forth.

16. The combination, with the tambour-frame, the needle-carrying carriage, mechanism for actuating said carriage to and fro with reference to the tambour-frame, a clutch mechanism for disconnecting said actuating mechanism from the driving or motive power, of the electro-magnet $D^6$, armature $C^6$, pawl $B^6$, block $A^6$, and metallic contact-pieces $b^5 F^2$, and mechanical devices for transmitting motion from the block $A^6$ to the clutch, all substantially as and for the purpose herein set forth.

17. The combination, with the tambour-frame, a needle-carrying carriage, and mechanism for moving the latter to and fro with reference to the tambour-frame, of the electro-magnet $D^6$, armature $C^6$, pawl $B^6$, block $A^6$, contact-pieces $b^5 F^2$, spring $d^5$, arranged to press the pawl toward the block $A^6$, a clutch arranged to disconnect the carriage-moving mechanism from its driving or motive power, and mechanism for transmitting motion between the said block $A^6$ and the said clutch, all substantially as and for the purpose herein set forth.

18. The combination, with the tambour-frame, needle-carrying carriage, and mechanism for moving the latter to and fro with reference to the tambour-frame, of the electro-magnet $D^6$, armature $C^6$, pawl $B^6$, block $A^6$, contact-pieces $b^5 F^2$, spring $d^5$, arranged to press the pawl toward the block $A^6$, a clutch arranged to disconnect the carriage-moving mechanism from its driving or motive power, lever-arms $n^4$ on the shaft $m^4$ of the block $A^6$, rods $o^4$, springs $S^4$, guides or bearings $p^4$, fixed to the frame, all substantially as and for the purpose herein set forth.

19. The combination, with the tambour-frame, needle-carrying carriage, mechanism for moving the latter to and fro with reference to the tambour-frame, and a clutch mechanism for disconnecting said actuating mechanism from its driving or motive power, of a rock-shaft, $C^2$, connecting with the said clutch mechanism to actuate the same, the pawl $H^2$, carried by said shaft, the arm $I^2$ on the shaft $m^4$, and mechanism, substantially as described, for actuating said shaft in unison with the movement of the needle-carrying carriage, all substantially as and for the purpose herein set forth.

20. The combination, with the tambour-frame, a needle-carrying carriage, mechanism for moving the latter to and fro with reference to the tambour-frame, and a clutch mechanism for disconnecting said actuating mechanism from its driving or motive power, of a rock-shaft, $C^2$, connected with the said clutch mechanism to actuate the same, the socket-arm $h^5$, attached to said rock-shaft, the pawl $H^2$, pivoted to said socket-arm, a spring, $k^5$, the arm $I^2$ on the shaft $m^4$, and mechanism, substantially as described, for actuating said shaft in unison with the movement of the needle-carrying carriage, all substantially as and for the purpose herein set forth.

21. The combination, with the tambour-frame, needle-carrying carriage, mechanism for moving the latter to and fro with reference to the tambour-frame, and a clutch mechanism for disconnecting said actuating mechanism from its driving or motive power, of a rock-shaft, $C^2$, connected with the said clutch mechanism to actuate the same, the pawl $H^2$, carried by said shaft $C^2$, the arm $I^2$ on shaft $m^4$, an electro-magnet, $D^6$, armature $C^6$, pawl $B^6$, block $A^6$, contact-pieces $b^5$ $F^2$, and mechanism for connecting the shaft $m^4$ with the arm $I^2$, all substantially as and for the purpose herein set forth.

22. The combination, with the tambour-frame, a needle-carrying carriage, mechanism for moving the latter to and fro with reference to the tambour-frame, and a clutch mechanism for disconnecting said actuating mechanism from its driving or motive power, of a rock-shaft, $C^2$, connected with the said clutch mechanism to actuate the same, the pawl $H^2$, carried by said shaft $C^2$, the arm $I^2$ on shaft $m^4$, an electro-magnet, $D^6$, armature $C^6$, pawl $B^6$, block $A^6$, contact-pieces $b^5$ $F^2$, arm $n^4$, rod $o^4$, and spring $s^4$, all substantially as and for the purpose herein set forth.

23. The combination, with the tambour-frame, needle-carrying carriage, mechanism for moving the latter to and fro with reference to the tambour-frame, and a clutch mechanism for disconnecting said actuating mechanism from its driving or motive power, of a rock-shaft, $C^2$, connected with the said clutch mechanism to actuate the same, the pawl $H^2$, carried by said shaft $C^3$, the arm $I^2$ on shaft $m^4$, an electro-magnet, $D^6$, armature $C^6$, pawl $B^6$, block $A^6$, contact-pieces $b^5$ $F^2$, arm $n^4$, and spring $s^4$, rod $o^4$, lever $y^4$, rod $k^4$, having loop $n'$, elbow-lever $j^4$, crank-arm $m^4$ on rock-shaft E, all substantially as and for the purpose herein set forth.

24. The combination, with the tambour-frame and a needle-carrying carriage, of mechanism for moving the latter to and fro with reference to the tambour-frame, a clutch mechanism for disconnecting said actuating mechanism from its driving or motive power, a brake mechanism for retarding the momentum of the carriage, and mechanism, substantially as herein set forth, for operating said brake mechanism synchronously with the clutch mechanism, all substantially as and for the purpose herein set forth.

25. The combination, with the tambour-frame and a needle-carrying carriage, of mechanism for moving the latter to and fro with reference to the tambour-frame, a clutch mechanism for disconnecting said actuating mechanism from its driving or motive power, and a brake mechanism, a jar-relieving mechanism, and mechanism, substantially as herein set forth, for operating the brake mechanism synchronously with the clutch mechanism, all substantially as and for the purpose herein set forth.

26. The combination, with a tambour-frame, a needle-carrying carriage, mechanism for moving the latter to and fro with reference to the tambour-frame, and mechanism for releasing the carriage from its actuating mechanism at the end of the outward movement of the said carriage, of a brake mechanism for stopping the momentum for such outward movement of the carriage when thus released, and mechanism, substantially as described, for insuring to the brake a yielding movement, all substantially as and for the purpose herein set forth.

27. The combination, with a tambour-frame and a needle-carrying carriage, of mechanism for moving the latter to and fro with reference to the tambour-frame, and mechanism for releasing the carriage from its actuating mechanism at the end of the outward movement of the said carriage, the shell $L'$, slotted collar $M'$, pawls $I^*$, having notches $o^3$, pivots $s^3$, and studs $l^3$, the springs $r^3$, plate $K'$, having flange $a^3$, and shaft $C'$, connected with the carriage mechanism, all substantially as and for the purpose herein set forth.

28. The combination, with the tambour-frame and a needle-carrying carriage, of mechanism for moving the latter to and fro with reference to the tambour-frame, and mechanism for releasing the carriage from its actuating mechanism at the end of the outward movement of the said carriage, the shell $L'$, having arm $b^3$, screw or bolt $d^3$, spring $v^3$, and socket $c^3$, slotted collar $M'$, pawls $I^*$, having notches $o^3$, pivots $s^3$, and studs $l^3$, the springs $r^3$, plate $K'$, having flange $a^3$, and shaft $C'$, connected with the carriage mechanism, all substantially as and for the purpose herein set forth.

29. The combination, with a tambour-frame, needle-carrying carriage, and mechanism for moving the latter to and fro with reference to the tambour-frame, of the hollow sleeve $N^8$, buffer-rods $P^8$, and frame or fixed resisting device for the buffer-rod to operate against, and springs $f^9$, arranged to act upon the said carriage during the latter portion of its inward movement, all substantially as and for the purpose herein set forth.

30. In combination with a tambour-frame, a needle-carrying carriage, mechanism for moving the said carriage outward from the tambour-frame, a counter-weight and connection for giving an initial inward movement to the said carriage toward the tambour-frame, and the mechanism for imparting the principal or concluding movement of said carriage toward the tambour-frame, all substantially as and for the purpose herein set forth.

31. In combination with a tambour-frame, a needle-carrying carriage, mechanism for moving the said carriage outward from the tambour-frame, a clutch mechanism for releasing the said carriage from its motive power at the end of its said outward movement, a counter-weight for imparting an initial inward movement of the said carriage toward the tambour-frame, and mechanism for imparting the principal or concluding inward movement of said carriage toward the tambour-frame, all substantially as and for the purpose herein set forth.

32. In combination with a tambour-frame, a needle-carrying carriage, and mechanism for moving the said carriage outward from the tambour-frame, a clutch mechanism for releasing the said carriage from its motive power at the conclusion of said outward movement, a brake mechanism for retarding the momentum of the said carriage when thus released by the clutch, a counter-weight, and connections for giving an initial inward movement to the carriage toward the tambour-frame, and mechanism for giving the principal or concluding inward movement to said carriage, all substantially as and for the purpose herein set forth.

33. The combination, with the tambour-frame, a needle-carrying carriage, mechanism for moving the latter to and fro with reference to the tambour-frame, and a clutch mechanism constructed and arranged to release the carriage from its motive power at the end of the outward movement of said carriage, of the pulley $o^*$ on the shaft $C'$ of the clutch mechanism, strap $r^*$, counter-weight $T^*$, vertical racks $i^*$, pulleys, substantially as described, for guiding the strap $r^*$ and for suspending the counter-weight from said strap, and pinion $G^*$, connected by a pawl and ratchet with the shaft $P^*$, in its turn connected by suitable means with the driving-shafts A, all substantially as and for the purpose herein set forth.

34. The combination, with the tambour-frame, a needle-carrying carriage, mechanism for moving the latter to and fro with reference to the tambour-frame, a clutch mechanism constructed and arranged to release the carriage from its motive power at the end of the outward movement of said carriage, and an electric circuit apparatus, of the adjustable metallic spring $K^8$, attached to the carriage, the stationary metallic spring $J^8$, and means for throwing the two springs out of contact with each other, all substantially as and for the purpose herein set forth.

35. The combination, with a tambour-frame, a needle-carrying carriage, the straps $G'$, pulley-faced disks $D'$, and mechanism for operating said disks alternately in opposite directions to move the carriage, of the threaded bolts $i^9$, provided with socket-heads $j^9$, keys $l^9$, and nuts $k^9$, all substantially as and for the purpose herein set forth.

36. The combination, with a tambour-frame and a needle-carrying carriage, the straps $G'$, pulley-faced disks $D'$, and mechanism for operating said disks alternately in opposite directions to move the carriage, of the longitudinal keys $m^9$ and set-screws $n^9$, all substantially as and for the purpose herein set forth.

37. In combination with a tambour-frame, a needle-carrying carriage, the straps $G'$, pulley-faced disks $D'$, having openings $s^9$, bolts $h^4$, having slots $r^9$, and set-screws $i^4$, all substantially as and for the purpose herein set forth.

38. The combination, with a tambour-frame and a needle-carrying carriage, of a brake mechanism and electric apparatus for actuating the said brake mechanism, and means for actuating the carriage with reference to the tambour-frame, all substantially as and for the purpose herein set forth.

39. The combination, with the tambour-frame and duplicate needle-carrying carriages, of a brake mechanism, an electric apparatus for actuating the same, and means for actuating the said carriages, all substantially as and for the purpose herein set forth.

JOSEPH IRISH.

Witnesses:
SAMUEL B. WYMAN,
CLARENCE E. BURNHAM.